United States Patent
Takeda et al.

(10) Patent No.: US 8,934,170 B2
(45) Date of Patent: Jan. 13, 2015

(54) PHOTOCHROMIC POLARIZING PLATE AND SHUTTER POLARIZING PLATE

(71) Applicant: FUJIFILM Corporation, Tokyo (JP)

(72) Inventors: Jun Takeda, Kanagawa (JP); Shinichi Morishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 265 days.

(21) Appl. No.: 13/661,329

(22) Filed: Oct. 26, 2012

(65) Prior Publication Data

US 2013/0107173 A1 May 2, 2013

(30) Foreign Application Priority Data

Oct. 27, 2011 (JP) .................. 2011-235685

(51) Int. Cl.
*G02B 5/30* (2006.01)
*G02B 5/23* (2006.01)
*G02F 1/13363* (2006.01)

(52) U.S. Cl.
CPC .............. *G02B 5/23* (2013.01); *G02F 1/13363* (2013.01); *G02B 5/3083* (2013.01); *G02F 2001/133631* (2013.01); *G02B 5/3025* (2013.01)
USPC ...................................... 359/483.01; 359/241

(58) Field of Classification Search
CPC ....... G02B 5/23; G02B 5/3025; G02B 5/3083; G02F 1/13363; G02F 2001/133631
USPC .......... 359/241, 483.01, 491.01; 349/96, 102, 349/104
See application file for complete search history.

(56) References Cited

U.S. PATENT DOCUMENTS

| | | | | |
|---|---|---|---|---|
| 5,706,131 A | * | 1/1998 | Ichimura et al. | 359/487.06 |
| 2010/0232003 A1 | * | 9/2010 | Baldy et al. | 359/243 |
| 2011/0228510 A1 | * | 9/2011 | Park et al. | 362/19 |

FOREIGN PATENT DOCUMENTS

JP  2008-275976 A  11/2008

* cited by examiner

*Primary Examiner* — Frank Font
(74) *Attorney, Agent, or Firm* — Jean C. Edwards, Esq.; Edwards Neils PLLC

(57) ABSTRACT

Provided is a photochromic polarizing plate exhibiting reduced tint. The photochromic polarizing plate contains a laminate including at least one film, a polarizer, and an optically transparent substrate, wherein the photochromic polarizing plate has a single-plate transmittance $T_1(\lambda)\%$ and a crossed transmittance $T_2(\lambda)\%$ at a wavelength of $\lambda$ nm satisfying Formulae (1) to (4): Formula (1) $55\% \geq T_1(430) \geq 38\%$; Formula (2) $60\% \geq T_1(590) \geq 42.5\%$; Formula (3) $1.0 \geq T_1(430)/T_1(590) \geq 0.9$; and Formula (4) $T_2(430) \geq 0.02\%$.

20 Claims, 5 Drawing Sheets

(A) Transmission mode (B) Shielding mode

PHOTOCHROMIC POLARIZING PLATE AND SHUTTER POLARIZING PLATE

CROSS-REFERENCE TO RELATED APPLICATIONS

The present application claims the benefit of priority from Japanese Patent Application No. 235685/2011, filed on Oct. 27, 2011, the content of which is herein incorporated by reference in their entirety.

BACKGROUND OF THE INVENTION

1. Field of the Invention

The present invention relates to photochromic polarizing plates or shutter polarizing plates.

2. Description of the Related Art

Various photochromic techniques utilizing polarizers have been proposed (for example, see JP-A-2008-275976). These photochromic techniques have been also expected to be utilized to control the intensity of sunlight incident on windows of buildings. However, bonding a polarizer (also referred to as a linear polarizing film) to optically transparent substrates, such as a glass substrate, causes the optically transparent substrate to be tinted. The hue and degree of tint of window glass have an influence on the amenity of the indoor space. In recent years, for example, windows of commercial facilities, such as display windows, are provided with optically transparent display devices in some cases, and the tint of the windows causes images displayed on the display devices to be tinted, which problematically impairs the quality of the appearance of the images.

SUMMARY OF THE INVENTION

It is an object of the present invention to provide a photochromic polarizing plate and a shutter polarizing plate exhibiting reduced tint and being usable in various applications.

The objects of the present invention can be accomplished by the following means:

[1] A photochromic polarizing plate comprising;
a laminate including at least one film, a polarizer, and an optically transparent substrate, wherein
the photochromic polarizing plate has a single-plate transmittance $T_1(\lambda)\%$ and a crossed transmittance $T_2(\lambda)\%$ at a wavelength of $\lambda$ nm satisfying Formulae (1) to (4):

$$55\% \geq T_1(430) \geq 38\%; \quad \text{Formula (1)}$$

$$60\% \geq T_1(590) \geq 42.5\%; \quad \text{Formula (2)}$$

$$1.0 \geq T_1(430)/T_1(590) \geq 0.9; \text{ and} \quad \text{Formula (3)}$$

$$T_2(430) \geq 0.02\%. \quad \text{Formula (4)}$$

[2] The photochromic polarizing plate according to [1], wherein the single-plate transmittance $T_1(\lambda)\%$ satisfies Formulae (1') and (2'):

$$55\% \geq T_1(430) \geq 38.5\%; \text{ and} \quad \text{Formula (1')}$$

$$60\% \geq T_1(590) \geq 43\%. \quad \text{Formula (2')}$$

[3] The photochromic polarizing plate according to [1], wherein the single-plate transmittance $T_1(\lambda)\%$ satisfies Formulae (1") and (2"):

$$55\% \geq T_1(430) \geq 39\%; \text{ and} \quad \text{Formula (1")}$$

$$60\% \geq T_1(590) \geq 45\% \quad \text{Formula (2")}$$

[4] The photochromic polarizing plate according to any one of [1] to [3], wherein at least one of the layer(s) included in the laminate contains at least one ultraviolet absorber.

[5] The photochromic polarizing plate according to any one of [1] to [4], wherein the laminate includes a patterned optically anisotropic layer having a first retardation region and a second retardation region which have a difference in at least one of the direction of an in-plane slow axis and in-plane retardation characteristics to each other, and the first and second retardation regions are arranged at a pattern having a width L of 1 to 50 mm in an arbitrary direction in a plane.

[6] The photochromic polarizing plate according to [5], wherein the patterned optically anisotropic layer has a boundary having a width L1 between the adjoining first and second retardation regions, and the width L and the width L1 satisfy Formula (a)

$$100 \leq L/L1 \geq 5{,}000 \quad \text{Formula (a)}$$

[7] The photochromic polarizing plate according to any one of [5] and [6], further comprising: a dyed portion provided on at least one of the upper and lower sides of the patterned optically anisotropic layer at a position corresponding to the boundary.

[8] The photochromic polarizing plate according to any one of [5] to [7], wherein the first and second retardation regions are stripes having a width L.

[9] The photochromic polarizing plate according to any one of [5] to [8], wherein the in-plane slow axis of the first retardation region and the transmission axis of the polarizer and the in-plane slow axis of the second retardation region and the transmission axis of the polarizer each have an angle of +45° and −45°.

[10] The photochromic polarizing plate according to any one of [5] to [9], wherein the sum of the in-plane retardation Re(550) of the other components of the laminate other than the polarizer is in the range of 110 to 160 nm at a wavelength of 550 nm.

[11] The photochromic polarizing plate according to any one of [5] to [10], further comprising an alignment film adjoining the patterned optically anisotropic layer and subjected to alignment treatment in a single direction.

[12] The photochromic polarizing plate according to [11], wherein the alignment film is a rubbed alignment film rubbed in a single direction.

[13] The photochromic polarizing plate according to any one of [5] to [12], wherein the patterned optically anisotropic layer comprising a composition primarily containing a discotic liquid crystal having a polymerizable group.

[14] The photochromic polarizing plate according to [13], wherein the molecules of the discotic liquid crystal are fixed in a vertical alignment state.

[15] A shutter polarizing plate comprising:
two photochromic polarizing plates according to any one of [5] to [14].

The present invention can provide a photochromic polarizing plate and a shutter polarizing plate, these polarizing plates exhibiting reduced tint and being usable in various applications.

BEST MODE FOR CARRYING OUT THE INVENTION

Figure 1:
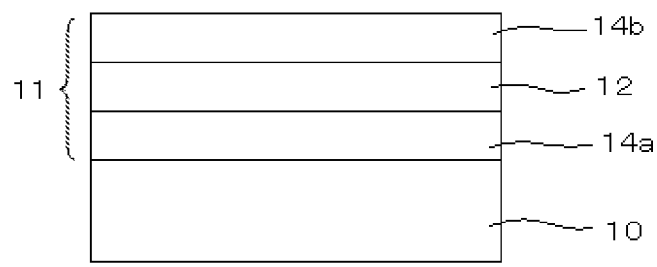
FIG. 1 is a schematic cross-sectional view illustrating a photochromic polarizing plate of an embodiment of the present invention.

The invention is described in detail hereinunder. Note that, in this patent specification, any numerical expressions in a style of " . . . to . . . " will be used to indicate a range including the lower and upper limits represented by the numerals given before and after "to", respectively.

In the description, the term "visible light" is used for any light having wavelengths from 380 nm to 780 nm. In the description, the wavelength of measurement is 550 nm as far as there is no specific notation.

In the description, the angles (for example, "90°") and the relations thereof (for example, expression of "orthogonal", "parallel" or "crossed by 45°") should be interpreted so as to include errors generally acceptable in the technical field to which the present invention belongs. For example, the angle desirably falls within a range of an exact angle±an angle less than 10°, more desirably within a range of an exact angle ±5°, or even more desirably within a range of an exact angle ±3°.

The present invention relates to a photochromic polarizing plate including a laminate which includes at least one film, a polarizer, and an optically transparent substrate. The optically transparent substrate is a glass plate or a plastic substrate such as an acrylic plate. In the case where two polarizers having absorption axes orthogonal to each other and exhibiting linear polarization characteristics are, for instance, laminated on the optically transparent substrate into a polarizing plate, the polarizing plate can modulate the transmission of incident light as a function of its incident angle, in other words, can control the intensity of the light. Furthermore, use of a patterned optically anisotropic layer which will be described below can also impart a photochromic function.

The lamination of the polarizers, however, causes optically transparent substrates such as a colorless transparent glass plate to be tinted. The hue and degree of the tint is affected by characteristics of the laminated polarizers. For example, lamination of polarizers generally used in liquid crystal display devices generates a yellow tint. Windows having yellow tint may impair the amenity of the indoor space. In addition, windows of commercial facilities, such as display windows, are provided with optically transparent display devices in some cases, and the windows having yellow tint causes images on the display devices to be tinted, which significantly impairs the quality of the appearance of the images.

In the technical field of display devices such as liquid crystal display devices, one of the technical objects is to provide an ideal black-displaying mode. In order to provide the ideal black-displaying mode, it is important to prevent leakage of short-wavelength light; hence, polarizing plates used in liquid crystal display devices generally have a single-plate transmittance $T_1(\lambda)\%$ satisfying Formula (i). In addition, it is important to reduce a crossed transmittance $T_2$ close to zero to provide the ideal black-displaying mode (in particular, reducing the crossed transmittance $T_2$ below 0.01%); hence, the single-plate transmittance $T_1\%$ in a visible light range generally satisfies Formula (ii):

$$T_1(430)<38\% \quad\quad\quad \text{Formula (i)}$$

$$T_1(\lambda vis)<42.5\% \text{(where } \lambda vis \text{ is a wavelength within a visible light range)} \quad\quad\quad \text{Formula (II)}$$

The polarizing plate of the present invention is less likely to cause coloration and can therefore be used in various applications. For instance, the polarizing plate can be applied to windows, and the application to windows needs the polarizing plate to satisfy essential requirements for tint and optical transparency generated in use as a single polarizing plate. The inventor has conducted extensive studies and found that the tint can be remarkably reduced by a polarizing plate exhibiting a higher single plate transmittance of short-wavelength light than that of polarizing plates used in liquid crystal display devices. The inventor also have found that the tint can be further reduced by a polarizing plate exhibiting a lower single-plate transmittance $T_1$ and a higher crossed transmittance $T_2$ of a visible light range than those of polarizing plates used in liquid crystal display devices.

In particular, in the present invention, a polarizing plate has the single-plate transmittance $T_1(\lambda)\%$ and the crossed transmittance $T_2(\lambda)\%$ at a wavelength of $\lambda$ nm adjusted so as to satisfy Formulae (1) to (4), so that the above-mentioned problems are solved without damaging the functions of a polarizing plate.

$$55\% \geq T_1(430) \geq 38\%; \quad\quad\quad \text{Formula (1)}$$

$$60\% \geq T_1(590) \geq 42.5\%; \quad\quad\quad \text{Formula (2)}$$

$$1.0 \geq T_1(430)/T_1(590) \geq 0.9; \text{ and} \quad\quad\quad \text{Formula (3)}$$

$$T_2(430) \geq 0.02\% \quad\quad\quad \text{Formula (4)}$$

The term "single-plate transmittance $T_1(\lambda)\%$" herein refers to a proportion of light with a wavelength $\lambda$ passing through a single polarizing plate, and the term "crossed transmittance $T_2(\lambda)\%$" herein refers to a transmittance of light with a wavelength $\lambda$ passing through two polarizers laminated such that their absorption axes are orthogonal to each other. These transmittances can be measured with a spectrophotometer, specifically with an automatic polarizing film analyzer "VAP-7070" (manufactured by JASCO Corporation).

Formula (1) defines the range of the single-plate transmittance $T_1$ of light with a short wavelength in a visible light range (e.g., blue light). In terms of a reduction in tint, Formula (1') is preferably satisfied, and Formula (1") is more preferably satisfied. Formula (2) defines the range of the single-plate transmittance $T_1$ of light with a medium wavelength in a visible light range (e.g., green light). In terms of a reduction in tint, Formula (2') is preferably satisfied, and Formula (2") is more preferably satisfied.

$$55\% > T_1(430) > 38.5\% \quad (1')$$

$$55\% > T_1(430) > 39\% \quad (1'')$$

$$60\% > T_1(590) > 43\% \quad (2')$$

$$60\% > T_1(590) > 45\% \quad (2'')$$

Formula (3) defines the range of the proportion of the single-plate transmittance of green light to the single plate transmittance of blue light. In terms of a reduction in tint, $T_1(430)/T_1(590)$ is preferably in the range of 0.91 to 0.98, more preferably 0.91 to 0.95. Since polarizing plates generally used in display devices exhibit a small $T_1(430)$ to reduce tint caused by the leakage of short-wavelength light in a black-displaying mode as described above, $T_1(430)/T_1(590)$ is approximately 0.87.

Formula (4) defines a transmittance of a laminate including two polarizers having absorption axes orthogonal to each other. In terms of a reduction in tint, the transmittance is preferably in the range of 0.02 to 1.0%, more preferably 0.03 to 0.5%.

The polarizing plate of the present invention used for windows includes a laminate comprising a polarizer and an optically transparent substrate. Examples of the optically transparent substrate to be used include glass plates generally used for windows and plastic substrates such as an acrylic plate, a polycarbonate plate, and a polystyrene plate. A preferred thickness range of the optically transparent substrate varies depending on the intended use of the polarizing plate; it is generally from 0.1 to 20 mm for polarizing plates used for windows of buildings or from 1 to 10 mm for polarizing plates used for windows of vehicles such as automobiles.

Any polarizer can be included in the polarizing plate of the present invention used for windows. A variety of conventional linearly polarizing films can be employed without restriction. Examples of the polarizing films include iodine-based polarizing films, dye-based polarization films containing dichroic dyes, and polyene-based polarization films, and any of these polarizing films can be used in the present invention. In general, polyvinyl alcohol films are used to form iodine-based or dye-based polarizing films. The polarizing film can be produced, for instance, with reference to JP-A-2011-128584. The polarizer may be a layer formed through a coating process.

The polarizer may have an even or patterned structure. Examples of the polarizer include a patterned polarizer which has two or more regions having absorption axes in different directions and arranged in a predetermined pattern. Use of the patterned polarizer can impart a photochromic function and a shutter function to the polarizing plate used for windows. The patterned polarizer can be, for instance, readily produced with liquid-crystalline dichroic pigments. Examples of usable liquid-crystalline dichroic pigments include azo pigments disclosed in WO2010/123090A1. In an embodiment, the patterned polarizer has two regions having different absorption axes orthogonal to each other and arranged in a predetermined pattern. In this embodiment, the polarizing plate of the present invention having a photochromic function or a shutter function includes a combination of a patterned polarizer and a polarizer having an even structure with an absorption axis that is orthogonal to the absorption axis of one region of the patterned polarizer and parallel to the absorption axis of the other region or a combination of two patterned polarizers.

The polarizing plate of the present invention preferably includes a protective film formed on at least one surface of the polarizer to protect the polarizer. In an embodiment in which the polarizer is a layer formed through a coating process, the protective film may function as a support of the polarizer. Any protective film can be used, and polymer films primarily composed of various polymeric materials (including polymers and resins) can be used. Preferred films are primarily composed of polymers or resins having high optical transparency, mechanical strength, thermal stability, water-tightness, and isotropy. The material for forming the protective film usable in the invention includes, for example, polycarbonate polymers; polyester polymers such as polyethylene terephthalate, polyethylene naphthalate, etc.; acrylic polymers such as polymethyl methacrylate, etc.; styrenic polymers such as polystyrene, acrylonitrile/styrene copolymer (AS resin), etc. As other examples of the material usable herein, also mentioned are polyolefins such as polyethylene, polypropylene, etc.; polyolefinic polymers such as ethylene/propylene copolymer, etc.; vinyl chloride polymers; amide polymers such as nylon, aromatic polyamides, etc.; imide polymers; sulfone polymers; polyether sulfone polymers; polyether ether ketone polymers; polyphenylene sulfide polymers; vinylidene chloride polymers; vinyl alcohol polymers; vinyl-butyral polymers; arylate polymers, polyoxymethylene polymers; epoxy polymers; mixed polymers prepared by mixing the above-mentioned polymers. The polymer film in the invention may be formed as a cured layer of a UV-curable or thermocurable resin such as acrylic, urethane, acrylurethane, epoxy, silicone or the like resins.

A preferred protective film is primarily composed of at least one material selected from cellulose acylate, cyclic olefins, acrylic resins, polyethylene terephthalate resins, and polycarbonate resins.

The protective films may be commercially-available products, for example, ZEONEX and ZEONOR (manufactured by ZEON CORPORATION) and ARTON (manufactured by JSR Corporation). Various commercially-available cellulose acylate films can also be used.

The protective film may be formed through either a solution-casting process or a solvent-casting process. The protective film preferably has a thickness ranging from 10 to 1000 μm, more preferably 40 to 500 μm, and especially preferably 40 to 200 μm.

The protective film may have any optical characteristic. The protective film preferably exhibits optical isotropy to reduce light leakage observed in a diagonal direction, but the optical characteristics of the protective film should not be limited thereto. In particular, a preferred protective film exhibits an Re of 0 to 10 nm and an absolute value of Rth of not more than 20 nm.

In the polarizing plate of the present invention used for windows, any one of the layers preferably contains an ultraviolet absorber to prevent degradation due to exposure to sunlight. The ultraviolet absorber may be added to any layer of the polarizing plate. In an embodiment, for instance, the protective film contains the ultraviolet absorber. A preferred ultraviolet absorber exhibits high absorption of ultraviolet light with a wavelength of not more than 370 nm and exhibits low absorption of visible light with a wavelength of not less than 400 nm as much as possible in view of optical transparency. In particular, the transmittance of light with a wavelength of 370 nm is preferably 20% or lower, more preferably 10% or lower, and further preferably 5% or lower. Examples of such an ultraviolet absorber include, but are not limited to, oxybenzophenone compounds, benzotriazole compounds, salicylic acid ester compounds, benzophenone compounds, cyanoacrylate compounds, nickel complex salt compounds, and ultraviolet-absorbing polymers containing ultraviolet-absorbing groups. These ultraviolet absorbers may be used in combination.

During formation of the ultraviolet absorber-containing film through a solvent-casting process, the ultraviolet absorber is added to a dope, which is a solution of a polymer being a primary component. The ultraviolet absorber may be added to the dope after being preliminarily dissolved in an organic solvent, such as alcohol, methylene chloride, or dioxolane, or may be directly added to a dope composition. Ultraviolet absorbers insoluble in organic solvents, such as inorganic powder, are dispersed in a solution of a polymer being a primary component in an organic solvent with a dissolver or a sand mill, and then the dispersion is added to the dope.

If the cellulose acylate film is used, the ultraviolet absorber is preferably added to enhance light resistance.

In the present invention, the ultraviolet absorber is added in an amount of 0.1 to 5.0 parts by mass, preferably 0.5 to 2.0 parts by mass, and more preferably 0.8 to 2.0 parts by mass relative to 100 parts by mass of a primary component of the film.

In order to produce a polarizing plate which satisfies the characteristics represented by Formulae (1) to (4), the polarizer preferably exhibits a polarization degree of not more than 99.8% to incident light with a wavelength of 430 nm. The polarizer exhibiting such a polarization degree can be produced by decreasing an iodine dye content or decreasing the total stretching ratio of a polyvinyl alcohol film during a general production process of a polarizing plate. In addition, the optically transparent substrate and the protective film optionally provided to the polarizer preferably each exhibit a transmittance of not less than 90% to produce a polarizing plate which satisfies the characteristics represented by Formulae (1) to (4).

FIG. 1 is a schematic cross-sectional view illustrating a photochromic polarizing plate of an embodiment of the present invention. In the drawing, the relative thicknesses of individual layers do not always reflect the relative thicknesses of individual layers of an actual photochromic polarizing plate. The same holds true for the other drawings.

The polarizing plate illustrated in FIG. 1 includes an optically transparent substrate 10 formed from a glass plate or a plastic material and a polarizer 12 overlying the optically transparent substrate 10. Protective films 14a and 14b are formed on the two surfaces of the polarizer 12, respectively. If the polarizing plate illustrated in FIG. 1 is, for instance, applied to windows, the polarizing plate is preferably disposed such that the optically transparent substrate 10 faces the exterior. In order to impart a photochromic function to the polarizing plate, the protective film 14b preferably has an in-plane slow axis at an angle of 35 to 55°, more preferably 40 to 50° with respect to the absorption axis of the polarizer 12 or a direction orthogonal to the absorption axis. The protective film 14a preferably has an in-plane slow axis at an angle of −25 to 25° with respect to the absorption axis of the polarizer 12 or the direction orthogonal to the absorption axis.

The protective films 14a and 14b are bonded to the two surfaces of the polarizer 12 into a laminate 11, respectively, and the laminate 11 can be bonded to the optically transparent substrate 10 with a pressure sensitive adhesive to produce the polarizing plate illustrated in FIG. 1. Any pressure sensitive adhesive can be used, and an adhesive agent may be used. Examples of usable pressure sensitive adhesives include rubber-based pressure sensitive adhesives, acrylic-based pressure sensitive adhesives, silicone-based pressure sensitive adhesives, urethane-based pressure sensitive adhesives, vinyl alkyl ethers-based pressure sensitive adhesives, polyvinyl alcohol-based pressure sensitive adhesives, polyvinyl pyrrolidone-based pressure sensitive adhesives, polyacrylamide-based pressure sensitive adhesives, and cellulose-based pressure sensitive adhesives.

Figure 2:
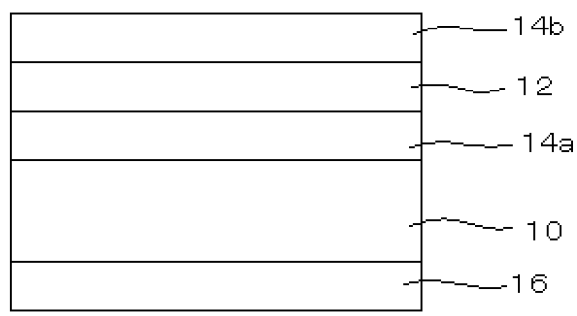
FIG. 2 is a schematic cross-sectional view illustrating a photochromic polarizing plate of another embodiment of the present invention.
Figure 3:
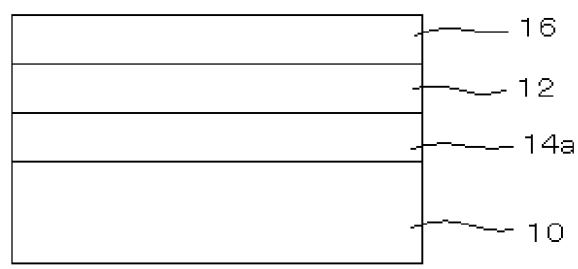
FIG. 3 is a schematic cross-sectional view illustrating a photochromic polarizing plate of another embodiment of the present invention.

FIGS. 2 and 3 are schematic cross-sectional views each illustrating a photochromic polarizing plate of another embodiment of the present invention. The same components as used in the photochromic polarizing plate illustrated in FIG. 1 are not repeatedly explained in detail and denoted by the same symbols.

The polarizing plate illustrated in FIG. 2 includes a patterned optically anisotropic layer 16 laminated on the back surface of the optically transparent substrate 10 of the polarizing plate illustrated in FIG. 1. The polarizing plate illustrated in FIG. 3 includes the patterned optically anisotropic layer 16 provided in place of the protective film 14b.

Figure 4:
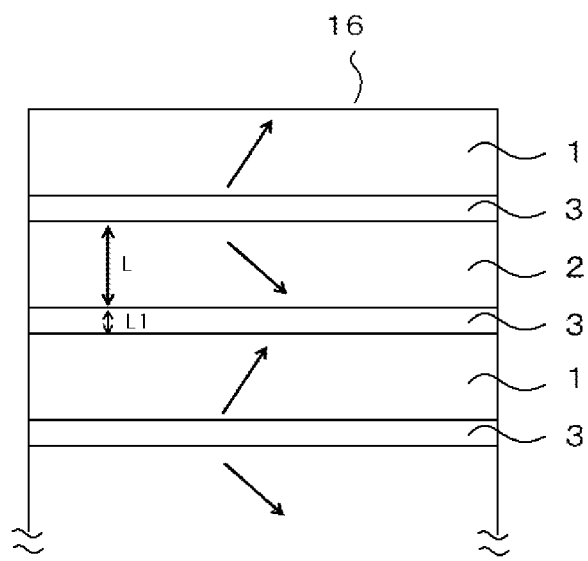
FIG. 4 is a schematic top view illustrating a patterned optically anisotropic layer applied to an embodiment of the present invention.

The patterned optically anisotropic layer 16, for instance, has a first retardation region and a second retardation region having a difference in at least any one of a direction of an in-plane slow axis and in-plane retardation characteristics, and the first and second retardation regions are arranged at a pattern having a width L of 1 mm to 50 mm in any in-plane direction in a plane. FIG. 4 is a top view illustrating an embodiment of the patterned optically anisotropic layer 16 including a first retardation layer 1 and a second retardation layer 2 with a boundary 3 interposed therebetween. The first and second retardation layers 1 and 2 have in-plane slow axes indicated by arrows, respectively. The same symbols as used in the other drawings indicate the same components unless otherwise specified.

FIG. 4 is schematic and simplified illustration of the geometric relationship between the first retardation region 1, the second retardation region 2, and the boundary 3 and does not illustrate an optimal dimensional relationship between them. A preferred range of the dimensional ratio thereof will be described later.

In FIG. 4, L indicates the width of each retardation region; in particular, L indicates a distance from one boundary 3 to the adjacent boundary 3 between first regions 1 and second retardation regions 2. The distance between one boundary 3 and the adjacent boundary 3 is the shortest distance between the average surface of an edge of one retardation region and the average surface of the opposite edge of this retardation region in its thickness direction. The term "average surface" herein refers to a reference level of an edge surface of a retardation region in its thickness direction on the assumption that its uneven surface profile is an even surface profile.

In the present invention, L preferably ranges from 1 mm to 50 mm in terms of a photochromic function.

L1 indicates the width of the boundary 3. L1 is the shortest distance between the average surface of an edge of one retardation region and the average surface of an edge of the adjacent retardation region in a thickness direction, the edge of the adjacent retardation region facing the edge of one retardation region. In the present invention, the distance L between the two adjacent boundaries 3 and the width L1 of the boundary 3 preferably satisfy Formula (a).

$$100 \leq L/L1 \leq 5{,}000 \qquad \text{Formula (a)}$$

Furthermore, the distance L and the width L1 more preferably satisfy the formula $200 \leq L/L1 \leq 5{,}000$, further preferably $400 \leq L/L1 \leq 5{,}000$, and even further preferably $500 \leq L/L1 \leq 5{,}000$. Within these ranges, cross talk is likely to be further reduced.

Preferably, the first retardation region 1 and the second retardation region 2 have the same shape and evenly arranged.

In the patterned optically anisotropic layer 16 of this embodiment, although the first region 1 and the second region 2 are alternately arranged in a striped pattern in sequence, any other arrangement is also available. In this embodiment, the striped pattern may be formed in the longitudinal direction of an optical film or in the direction orthogonal to the longitudinal direction.

In the present invention, the first retardation region and the second retardation region have a difference in at least one of the direction of an in-plane slow axis and the in-plane retardation characteristics.

In this embodiment, preferably, the first retardation region 1 and the second retardation region 2 at least have a difference in the direction of an in-plane slow axis. The first retardation region 1 and the second retardation region 2 have slow axes in a direction at ±45° with respect to any of their sides (preferably the striped pattern formed by the retardation regions), respectively. The angular difference in the direction of an in-plane slow axis between the first retardation region 1 and the second retardation region 2 is preferably from 70 to 110°, more preferably 80 to 100°, and further preferably 90°.

The first retardation region 1 and the second retardation region 2 preferably exhibit an in-plane retardation Re(550) of 110 to 160 nm, more preferably 120 to 170 nm, and further preferably 125 to 140 nm at a wavelength of 550 nm.

Figure 5:
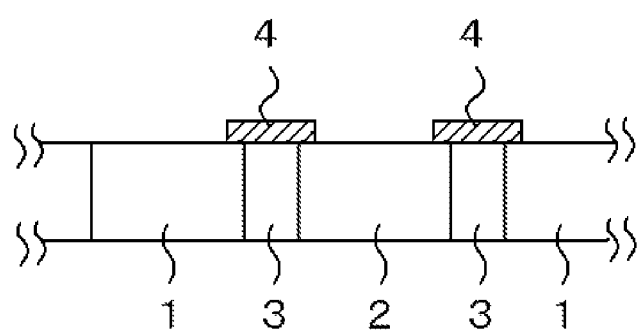
FIG. 5 is a schematic cross-sectional view illustrating the patterned optically anisotropic layer applied to the embodiment of the present invention.

The patterned optically anisotropic layer 16 preferably has a dyed portion provided on at least one of the upper and lower sides thereof so as to correspond to the boundary 3. FIG. 5 is a schematic cross-sectional view illustrating an embodiment of dyed portions 4 provided so as to cover the boundaries 3 between the first retardation region and the second retardation. The dyed portions 4 can prevent the unevenness of the photochromic function due to light leakage from the boundaries 3. The dyed portions 4 contain a pigment to reduce its optical transparency and preferably contain one or more pigments to have a black color or a hue similar to black.

The width of the dyed portion 4 is appropriately determined in view of brightness, crosstalk view angle and preferably 0.1 to 0.7 times, more preferably 0.3 to 0.5 times larger than the width L1 of the boundary 3.

The patterned optically anisotropic layer 16 may be formed on a surface of a support such as a polymer film and then incorporated into the polarizing plate along with the support. Especially in the embodiment illustrated in FIG. 3, the support of the patterned optically anisotropic layer 16 can be preferably utilized as the protective film for the polarizer 12. A preferred support is an optically transparent polymer film, and examples of the polymer film usable as the support are the same as the polymer films usable as the protective film for the polarizer. The sum of the Rth of the support and the Rth of the patterned optically anisotropic layer 16 preferably satisfies the relationship of |Rth|≤20 nm; hence, the support preferably satisfies the relationship of −150 nm≤Rth(630)≤100 nm.

The polarizing plate of this embodiment may include an alignment film provided so as to adjoin the patterned optically anisotropic layer. The alignment film has a function to control the alignment of liquid crystal molecules during formation of the patterned optically anisotropic layer. Examples of the alignment film include an alignment film subjected to alignment treatment in one direction and a rubbed alignment film rubbed in one direction. A process to form the patterned optically anisotropic layer with the alignment film will be described later.

The patterned optically anisotropic layer or the laminate including the patterned optically anisotropic layer and the support can be bonded to the optically transparent substrate or the polarizer with a pressure sensitive adhesive or an adhesive agent, and examples of usable pressure sensitive adhesives are the same as the pressure sensitive adhesives which can be used to bond the protective film to the optically transparent substrate.

Figure 6:
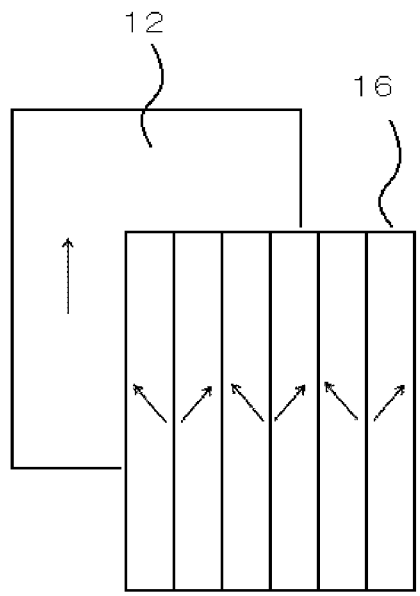
FIG. 6 is a schematic top view illustrating a combination of the absorption axis of a polarizer and the slow axis of the patterned optically anisotropic layer according to an embodiment of the present invention.

In an example of this embodiment, the in-plane slow axes of the first and second retardation regions are at ±45° with respect to the absorption axis of the polarizer 12, respectively. FIG. 6 illustrates the relationship of the absorption axis of the polarizer 12 and the in-plane slow axes in the patterned optically anisotropic layer 16, and the absorption axis of the polarizer 12 and the in-plane slow axes in the patterned optically anisotropic layer 16 define an angle of ±45°, respectively.

In the case where two polarizing plates of this embodiment are used in combination, the absorption axis of the polarizer of one polarizing plate is preferably orthogonal to the stripe, and the absorption axis of the polarizer of the other polarizing plate is preferably parallel to the stripe. This configuration will be described in detail later.

The patterned optically anisotropic layer usable in the present invention will now be described in detail.

Patterned Optically Anisotropic Layer

In the patterned optically anisotropic layer of the present invention, the retardation regions are preferably composed of a liquid crystal composition (desirably a composition containing a discotic liquid crystal compound), more preferably composed of the same curable liquid crystal composition primarily containing liquid crystal, and further preferably formed through a pattern exposure process.

Specifically, a first embodiment of a technique to form the patterned optically anisotropic layer involves utilizing a plurality of actions having effects on alignment control of liquid crystal molecules and then terminating any of the actions by an external stimulus (e.g., thermal treatment) to enhance the effect of predetermined alignment control of liquid crystal molecules. For example, liquid crystal molecules are maintained at a predetermined alignment state by a combination of the effect of alignment control by an alignment film and the effect of alignment control by an alignment-controlling agent contained in the liquid crystal composition, and then the alignment state is fixed to form a retardation region; subsequently, any of the effects (e.g., the effect of the alignment-controlling agent) is cancelled by external stimulus (such as thermal treatment) to enhance the effect of the other alignment control (the effect of the alignment film in this case) to provide another alignment state, and this alignment sate is fixed to form another retardation region. For instance, a certain pyridinium compound and an imidazolium compound have a pyridinium group and an imidazolium group which exhibit hydrophilic properties, respectively, and are therefore evenly distributed on a surface of the alignment film composed of polyvinyl alcohol and exhibiting hydrophilic properties. Especially, substituting the pyridinium group with an amino group being a substituent which functions as an acceptor of a hydrogen atom generates an intermolecular hydrogen bond to polyvinyl alcohol, which can evenly distribute a pyridinium compound in high density; in addition, the hydrogen bond enables the pyridinium derivative to be aligned in the direction orthogonal to the main chain of the polyvinyl alcohol, which promotes the alignment of liquid crystal molecules in the rubbed direction. Since the pyridinium derivative has multiple aromatic rings in its molecules, a strong intermolecular n-n interaction with the liquid crystal, especially, with discotic liquid crystal, is generated, which induces the orthogonal alignment of molecules of discotic liquid crystal in the vicinity of the interface with the alignment film. Especially in the case where pyridinium groups exhibiting hydrophilic properties are bonded to aromatic groups exhibiting hydrophobic properties, the hydrophobic properties induce the orthogonal alignment. Heating at a temperature exceeding a certain level, however, breaks the hydrogen bond, and the density of the pyridinium compound on a surface of the alignment film is decreased, resulting in elimination of the above-mentioned effect. Thus, liquid crystal molecules are aligned by a controlling force of the rubbed alignment film itself, so that the liquid crystal molecules enter a horizontal alignment state. The detail of this process is disclosed in Japanese Patent Application No. 2010-141346.

In a second embodiment, a technique to form the patterned optically anisotropic layer involves utilizing a patterned alignment film. In this embodiment, patterned alignment films having different alignment-controlling functions are formed, and a liquid crystal composition is provided thereon to align liquid crystal molecules. Alignment of the liquid crystal molecules is regulated by the different alignment-controlling functions of the patterned alignment films to provide different alignment states, respectively. The different alignment states are fixed, so that the patterns of the retardation regions are formed in response to the patterns of the alignment films. The patterned alignment films can be formed by utilization of printing, mask rubbing of a rubbed alignment film, or mask exposure of a photo alignment film. A patterned alignment film can be prepared by evenly forming an alignment film and then printing a predetermined pattern of an additive agent having an alignment-controlling function (e.g., above-mentioned onium salts). A preferred process is a printing process, which eliminates use of large equipment and enables easy production. The detail of the printing process is disclosed in Japanese Patent Application No. 2010-173077.

The first and second embodiments may be used in combination. For instance, a photoacid generator is added to an alignment film. In this case, the alignment film contains the photoacid generator, and two or more retardation regions can be formed by adjusting the amount of exposure (the intensity of exposure) to an on-state and off-state.

In other words, pattern exposure is carried out to form a region of an acid compound generated by decomposition of the photoacid generator and another region of the undecomposed photoacid generator. In a region which is not irradiated with light, the photoacid generator is not substantially decomposed, and an interaction among a material of the alignment film, liquid crystal, and an alignment-controlling agent optionally added controls the alignment state of liquid crystal molecules such that their slow axes are orthogonal to a rubbed direction. In the case where the alignment film is irradiated with light to generate an acidic compound, the interaction is not dominant. Instead, the rubbed direction of the alignment film controls the alignment state, and the liquid crystal molecules are aligned such that their slow axes are parallel to the rubbed direction. A preferred photoacid generator to be contained in the alignment film is a water-soluble compound. The detail of this process is disclosed in Japanese Patent Application No. 2010-289360.

An especially preferred process of producing the optical film of the present invention includes several steps in sequence.

One example of the process for producing the optical film of the invention comprises:

1) forming an alignment layer of a composition, comprising at least one photo-acid-generating agent, on a transparent support;

2) irradiating the alignment layer with light through a photo-mask, thereby to decompose the at least one photo-acid-generating agent in the irradiated area, and to generate an acidic compound in the irradiated area, 3) applying a composition, comprising a liquid crystal having a polymerizable group as a main ingredient, to the alignment layer, thereby to form a coated layer, 4) aligning the liquid crystal at a temperature of $T_1$ degrees Celsius, so that a slow axis of the irradiated domain is aligned along a first direction and a slow axis of the non-irradiated domain is aligned along a second direction which is different from the first direction; and 5) polymerizing the liquid crystal at a temperature of $T_2$ ($T_1 > T_2$) degrees Celsius, thereby to fix the liquid crystal in an alignment state, and to form an optically anisotropic patterned layer with a first retardation domain and a second retardation domain having slow axes which are aligned along the directions different from each other.

In the process, for forming the optically anisotropic patterned layer, an alignment layer subjected to an alignment treatment along one direction is preferably used, or an alignment layer subjected to a rubbing or photo-alignment treatment along one direction is more preferably used. The alignment treatment may be carried out between the 1) and the 2) steps, or the 2) and 3) steps. The alignment treatment is preferably carried out between the 1) and the 2) steps.

The rubbed alignment layer becomes to exhibit the ability of controlling alignment by being subjected to a rubbing treatment. Generally, if a liquid crystal is aligned on a surface subjected to a rubbing treatment along one direction, the liquid crystal is aligned so that the slow axis thereof is parallel to or orthogonal to the rubbing direction. Which alignment state is obtained may depend on various factors such as the type of the material of the alignment layer, the type of liquid crystal and the type of the agent capable of controlling the alignment. As described later, according to the present invention, the action of the acid compound generated by irradiation with ultraviolet light to the alignment layer contributes to decomposing the material of the alignment layer and/or varying the localization property of the agent capable of controlling, thereby to achieve both of the alignment state with the slow axis of the liquid crystal parallel to the rubbing direction and the alignment state with the slow axis of the liquid crystal orthogonal to the rubbing direction. The pattern, having a preferable shape and arrangement, of the optically anisotropic layer, or the preferable shape and arrangement of the first and second retardation regions thereof, may be obtained by selecting a photo-mask to be used in the 2) step. In the embodiment to be used in a stereoscopic display device capable of displaying stereoscopic imagery, preferably, the first and second retardation domains are stripes with the same short side, and are arranged alternately.

According to the process of the present invention, the slow axis of the liquid crystal in the area irradiated with the light is aligned along a first direction; and the slow axis of the liquid crystal in the area not irradiated with the light is aligned along a second direction which is different from the first direction. Since the photo-acid-generating agent is decomposed by irradiation of the light, the difference in the ration of an acid compound generated by the decomposition of the photo-acid-generating agent occurs between the irradiated area and the non-irradiated area of the alignment layer, which can bring about the difference in aligning force between the areas. One example thereof is as follows.

In the non-irradiated area, since the photo-acid-generating agent exists in the almost undecomposed state, the alignment state is decided dominantly by the interaction of the alignment-layer material, the liquid crystal and the agent capable of controlling the alignment which is added if desired. Under such a control, the liquid crystal is aligned so that the slow axis thereof is orthogonal to the rubbing direction. After being irradiated with the ultraviolet light, since an acid compound is generated from the photo-acid-generating agent in the irradiated area and the interaction is not dominative anymore, the alignment state in the irradiated area is dominantly controlled by the rubbing direction of the rubbed alignment layer. Under such a control, the liquid crystal is aligned so that the slow axis thereof is parallel to the rubbing direction. The preferable conditions achieving these states may vary depending on the type and/or the amount of each ingredient and the irradiation condition, and the preferable condition in all of the embodiments cannot be decided. According to the invention, generation and dispersion of the acid compound occurs, and therefore, the environmental condition including the temperature and the humidity, or the irradiance level may contribute to the pattern accuracy. For example, the step of rubbing the alignment layer or applying the coating liquid is preferably carried out under the condition with a high temperature and a high humidity, in particular, the humidity is preferably equal to or higher than 40%, or more preferably equal to or higher than 60%. Adding a small amount of water to the liquid crystal composition to be used for forming the optically anisotropic layer is also preferable.

In the example, the coating liquid to be used in the 3) step may comprise an agent capable of controlling alignment at an alignment layer-interface; and an acidic compound or an ion thereof, generated in the irradiated area of the alignment layer during the 2) step, may decrease the degree of localization of the agent to the alignment-layer interface, thereby to bring about the difference in aligning force between the irradiated area and the non-irradiated area of the alignment layer. By using an onium salt as the agent capable of controlling alignment at an alignment layer-interface, it is possible to align a discotic liquid crystal so that the disk-faces of the discotic liquid crystal molecules are orthogonal to the rubbing direction and vertical to the layer plane, or namely align a discotic liquid crystal in an orthogonal and vertical alignment state. In the non-irradiated area, since the agent capable of controlling alignment at an alignment layer-interface is localized to the alignment layer interface, the discotic liquid crystal is aligned in the orthogonal and vertical alignment state. However, after being irradiated with the light, since the localization property of the agent is decreased by an acid compound or ion thereof generated from the photo-acid-generating agent and the action of the agent is weakened, the alignment state in the irradiated area is dominantly controlled by the rubbing direction of the rubbed alignment layer. Under such a control, the discotic liquid crystal is aligned so that the disk-faces of the discotic liquid crystal molecules are parallel to the rubbing direction and vertical to the layer plane, or namely the alignment state of the discotic liquid crystal transfers to a parallel and vertical alignment state.

In the embodiment, the decrease of the localization to the alignment layer interface of the agent capable of controlling the alignment at the alignment layer interface may be caused by the ion-exchange of the ion constituting the agent capable of controlling the alignment at the alignment layer interface with the ion constituting the acidic acid generated from the photo-acid-generating agent in the irradiated area. According to the embodiment in which an onium salt of pyridinium or imidazolium compound is used as an agent capable of controlling the alignment at the alignment layer interface, the decrease of the localization to the alignment layer interface of the onium salt may be caused by the anion-exchange of the onium salt with the acidic compound generated from the photo-acid-generating agent in the irradiated area.

In the 2) step, irradiation of light through a photo-mask is carried out for generating an acidic compound. As described above, since the acidic compound is generated and dispersed while the photo-acid-generating agent is decomposed, in the step of irradiation of light through a photo-mask, UV light is preferable, or non-polarized UV light is more preferable. The peak of the irradiation wavelength is preferably from 200 nm to 250 nm; and an UV-C light source is preferably used. The irradiation amount thereof is preferably from about 5 mJ/cm$^2$ to about 1000 mJ/cm$^2$, or more preferably from about 5 mJ/cm$^2$ to about 50 mJ/cm$^2$. If the irradiation amount is too small, it may be impossible to form a patter. On the other hand, if the irradiation amount is too large, the resolution may be decreased due to the dispersion of the acidic compound. For improving the resolution, irradiation of light is preferably carried out at a room temperature.

The condition of the photo-irradiation may be decided depending on the formulation of the alignment layer or the like, and therefore, the condition thereof is not limited to the above.

In the 5) step, fixing the alignment state is preferably achieved by carrying out the polymerization of a polymerizable liquid crystal under irradiation of the light (for example, under irradiation of UV light). The irradiation energy is preferably from 10 mJ/cm$^2$ to 10 J/cm$^2$, or more preferably from 25 mJ/cm$^2$ to 800 mJ/cm$^2$. The illumination intensity is preferably from 10 mW/cm$^2$ to 1000 mW/cm$^2$, more preferably from 20 mW/cm$^2$ to 500 mW/cm$^2$, or even more preferably from 40 mW/cm$^2$ to 350 mW/cm$^2$. The peak of the irradiation wavelength is preferably from 250 nm to 450 nm, or more preferably from 300 nm to 410 nm. For promoting the photopolymerization, irradiation of light may be carried out under an atmosphere of an inert gas such as nitrogen gas or under heat. As the light source, a low-pressure mercury lamp (e.g., bactericidal lamp, fluorescence chemical lamp, black light), a high-pressure discharge lamp (e.g., high-pressure mercury lamp, metal halide lamp), or a short-ark discharge lamp (e.g., ultra high-pressure mercury lamp, xenon lamp, mercury-xenon lamp) is preferably used.

Since the polymerization for fixing the alignment state is carried out enough promptly, the alignment state of the optically anisotropic layer is not influenced even if the decomposition of the photo-acid-generating agent occurs by irradiation of the light to a whole surface in the 5) step.

Fixing the alignment state in the 5) step is carried out at $T_2$ degrees Celsius so that $T_1 > T_2$ is satisfied in the relation with the alignment temperature of $T_1$ degrees Celsius in the 4) step. If the condition is satisfied, it is possible to fix the alignment state while preventing the disorder of the alignment state. The preferable ranges of $T_1$ degrees Celsius and $T_2$ degrees Celsius may be varied depending on the materials to be used. Generally, $T_1$ is preferably from about 50 degrees Celsius to about 150 degrees Celsius; and $T_2$ is preferably from about 20 degrees Celsius to about 120 degrees Celsius. The difference between $T_1$ and $T_2$ is preferably about 10 degrees Celsius to about 100 degrees Celsius.

Alignment Layer:

An alignment layer which can realize an optically anisotropic patterned layer is formed by the 1) and 2) steps. Furthermore, an alignment treatment along one direction is preferably carried out between the 1) and 2) steps or the 2) and 3) steps. The alignment treatment is preferably a rubbing treatment. Namely, in the invention, a rubbed alignment layer is preferably used.

The "rubbed alignment layer" which can be used in the invention means a film subjected to a treatment by rubbing so as to exhibit an ability of controlling the alignment. The rubbed alignment layer has an alignment axis controlling the alignment of liquid crystal molecules, and liquid crystal molecules are aligned on the basis of the alignment axis. According to the invention, liquid crystal molecules in the irradiated area are aligned so that the slow axes thereof are parallel to the rubbing direction of the alignment layer, liquid crystal molecules in the non-irradiated area are aligned so that the slow axes thereof are orthogonal to the rubbing direction of the alignment layer; and for obtaining the alignment states, the material of the alignment layer, the photo-acid-generating agent, liquid crystal and the agent capable of controlling agent may be selected.

Generally, a rubbed alignment layer contains a polymer as a main ingredient. The description regarding the polymer materials for alignment layers can be found in various documents, and many materials may be commercially available. The polymer material which can be used in the present invention is preferably selected from polyvinyl alcohols, polyimides, or any derivatives thereof. Especially, modified or non-modified polyvinyl alcohols are preferable. Polyvinyl alcohols having any saponification degree may be available, and according to the invention, polyvinyl alcohols having a saponification degree of from about 85 to about 99 are preferably used. Any commercially available polyvinyl alcohols may be used, and, in particular, both of "PVA103" and "PVA203" (Kuraray Co., Ltd.) are polyvinyl alcohols having the saponification degree falling within the above-described range. The modified polyvinyl alcohols, described in WO01/88574A1, p. 43, line 24-p. 49, line 8, or in Japanese Patent No. 3907735, columns 0071-0095, may be referred. The thickness of the alignment layer is preferably from 0.01 to 10 micrometers, or more preferably from 0.01 to 1 micrometer.

Usually, the rubbing treatment may be carried out by rubbing the surface of a layer, containing polymer as a main ingredient, several times in a constant direction with paper or cloth. The normal methods of the rubbing treatment are described in "Handbook of Liquid Crystals (Ekisho Binran)" published by Maruzen co., Ltd, Oct. 30, 2000), or the like.

In order to vary rubbing densities of alignment layers, it is possible to adopt methods described in "Handbook of Liquid Crystals (Ekisho Binran)" published by Maruzen co., Ltd. A rubbing density (L) can be defined by Formula (A) below.

$$L = Nl(1+2\pi rn/60v)$$ Formula (A)

"N" is a number of rubbing, "1" is a contact length of a rubbing roller, "r" is a radius of the roller, "n" is a rotation speed (rpm) of the roller, and "v" is a moving velocity of a stage (per a sec).

When increasing rubbing density, rubbing treatment may be carried out with a higher number of rubbing, longer 1, longer contact length of a rubbing roller, larger radius of the roller, higher rotation speed of the roller, or smaller moving velocity of a stage; on the other hand, when decreasing rubbing density, rubbing treatment may be carried out in opposite ways.

There is a relationship between a rubbing density and a pre-tilt angle of an alignment layer that the higher rubbing density the alignment layer is treated with, the lower pre-tilt angle of the alignment layer is; and the smaller rubbing density the alignment layer is treated with, the larger pre-tilt angle of the alignment layer is.

An alignment layer to be bonded to a long polarizing film having an absorption axis parallel to the long direction thereof may be prepared by forming a polymer layer on a long polymer film, which is a support, and then rubbing the surface of the layer in a 45° direction relative to the long direction.

Any photo-alignment layer may be used if possible (for example, in the case that the process of light irradiation for decomposition of the photo-acid-generating agent and the process of light irradiation for developing the photo-alignment ability can be carried out separately).

Photo-Acid-Generating Agent:

The alignment layer of the present invention contains at least one photo-acid-generating agent. The photo-acid-generating agent is any compound capable of decomposing by light irradiation such as UV light irradiation and capable of generating an acidic compound. When the photo-acid-generating agent decomposes and then an acidic compound is generated, the variation of the orientation-controlling ability occurs. The variation of the orientation-controlling ability may be identified as a variation of the orientation-controlling ability achieved by only an alignment layer, may be identified as a variation of the orientation-controlling ability achieved by an alignment layer and other factor(s) such as an additive in a composition for preparing an optically anisotropic layer disposed on the alignment layer, or may be identified as any combination thereof.

The discotic liquid crystal, described later, may be aligned in an orthogonal-vertical alignment state by being added with an onium salt. When the anion-exchange is carried out between the acidic salt which is generated via the decomposition and the onium salt, the localization of the onium salt to the interface of the alignment layer may be reduced, the ability of aligning the discotic liquid crystal in the orthogonal-vertical alignment state may be weakened, and then the discotic liquid crystal may be aligned in a parallel-vertical-alignment state. Or, when a polyvinyl alcohol-base alignment layer is used, the ester portions thereof may be decomposed by a generated acidic compound, which may change the localization property of the onium salt to the interface of the alignment layer.

As the photo-acid-generating agent to be used in the alignment layer, water-soluble compounds are preferable. Examples of the photo-acid-generating agent include those described in Prog. Polym. Sci., vol. 23, p. 1485, 1998. As the photo-acid-generating agent, pyridinium, iodonium or sulfonium salts are especially preferable. Preferable examples of the pyridinium, iodonium or sulfonium salt include those represented by the following formulas.

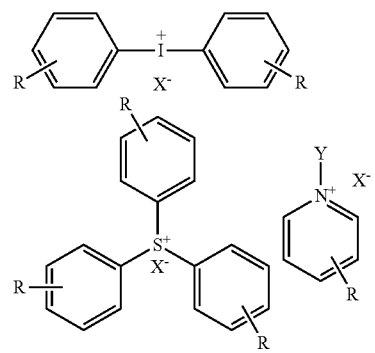

In the formulas, R represents a hydrogen atom, a linear or branched $C_{1-6}$ alkyl, a linear or branched $C_{1-6}$ alkoxy, a $C_{6-12}$ aryl or a halogen atom. Y represents a linear or branched $C_{1-6}$ alkyl, or a linear or branched $C_{1-6}$ alkoxy. $X^-$ represents a counter anion of a pyridinium salt, iodonium salt or sulfonium salt, which becomes an anion of an acidic compound generated by the decomposition. Preferably, $X^-$ represents $PFC_6^-$ or $BF_4^-$. For example, the acid, $HBF_4$, generates from the photo-acid-generating agent having $BR_4^-$ as $X^-$; and the acid, $HPF_6$, generates from the photo-acid-generating agent having PFC as X.
Examples of the photo-acid-generating agent include, but are not limited to, those shown below.
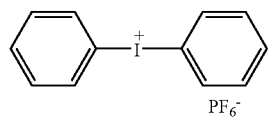
I-1
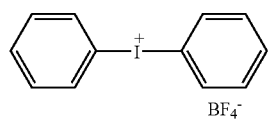
I-2
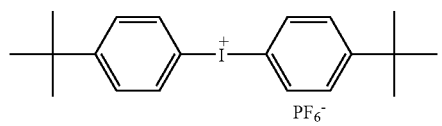
I-3
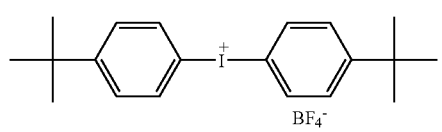
I-4
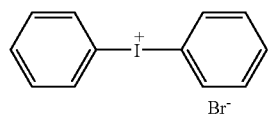
I-5
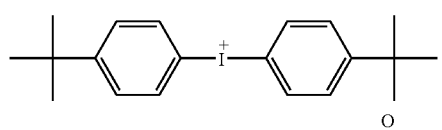
I-6
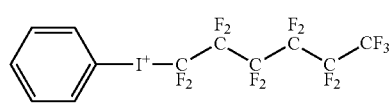
I-7
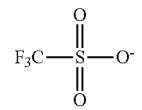
I-8
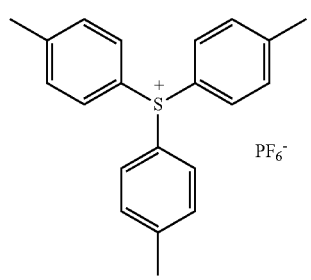
-continued
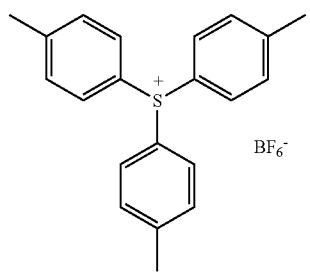
I-9
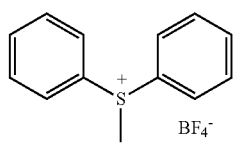
I-10
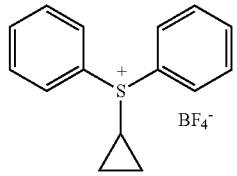
I-11
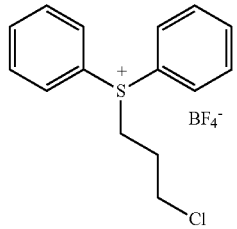
I-12
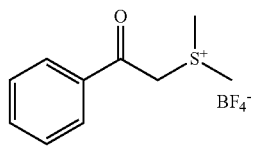
I-13
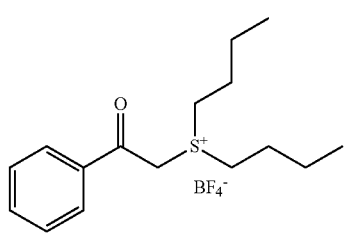
I-14
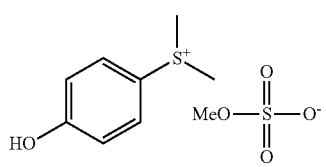
I-15

I-16
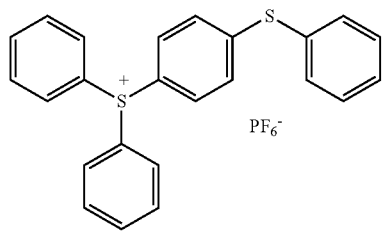
I-17
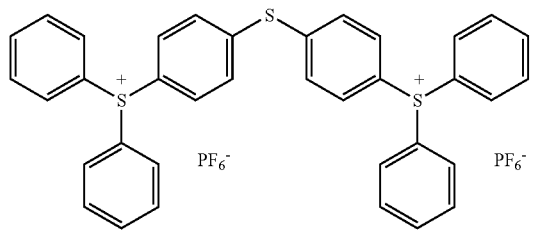
I-18
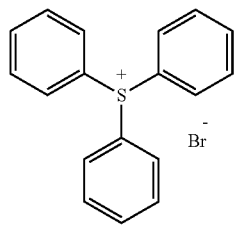
I-19
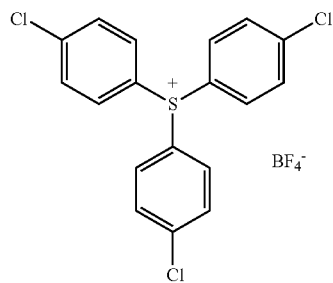
I-20
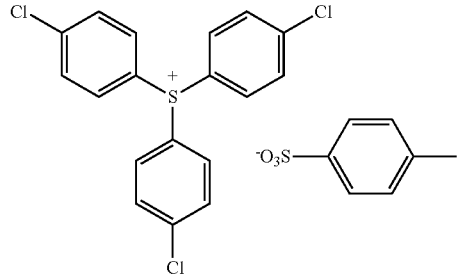
I-21
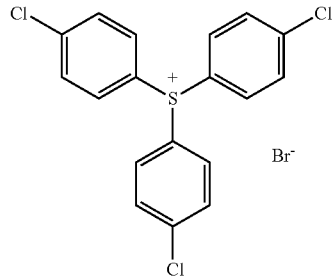
I-22
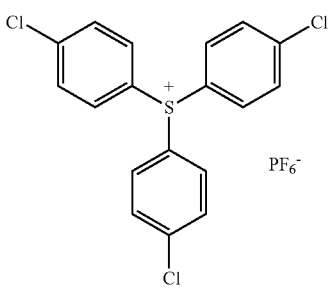
I-23
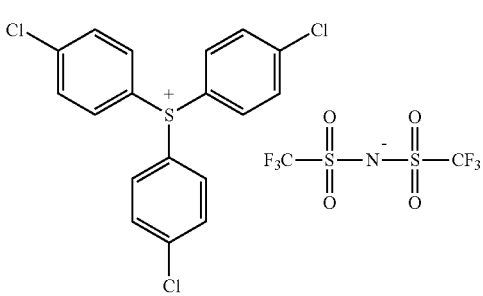
I-24
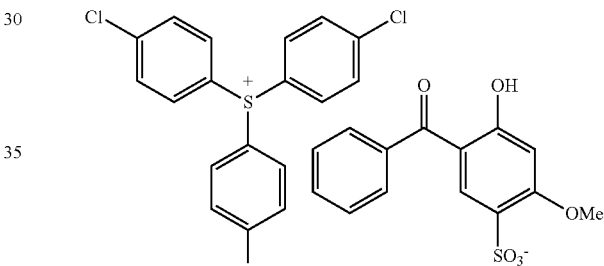
I-25
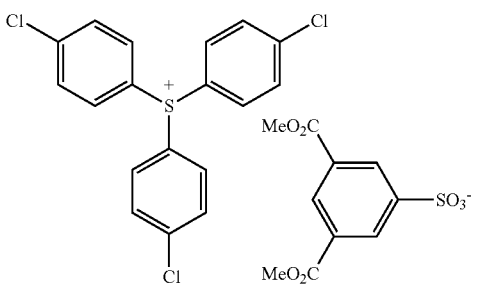
I-26
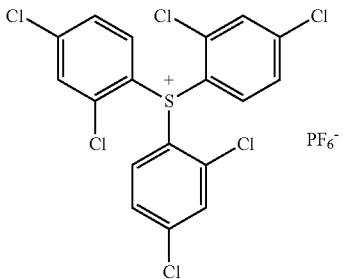

I-27 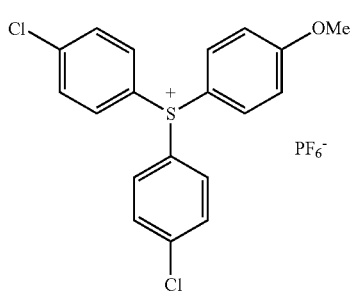
I-28 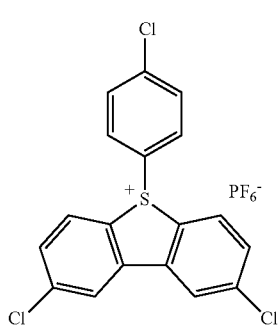
I-29 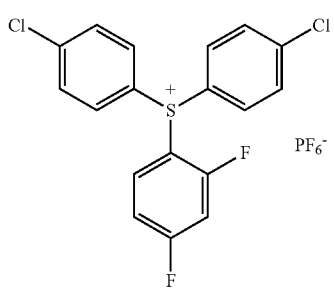
I-30 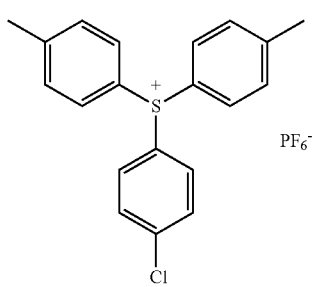
I-31 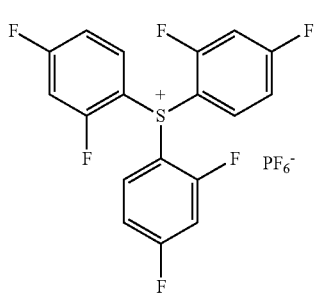
I-32 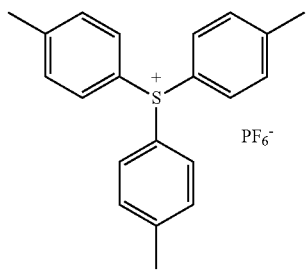
I-33 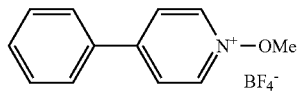
I-34 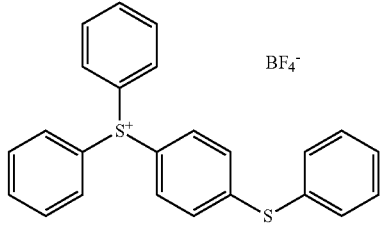
I-35 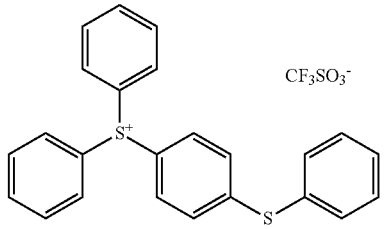
I-36 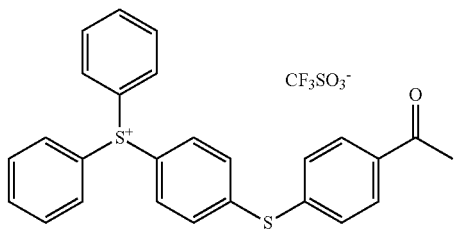
I-37 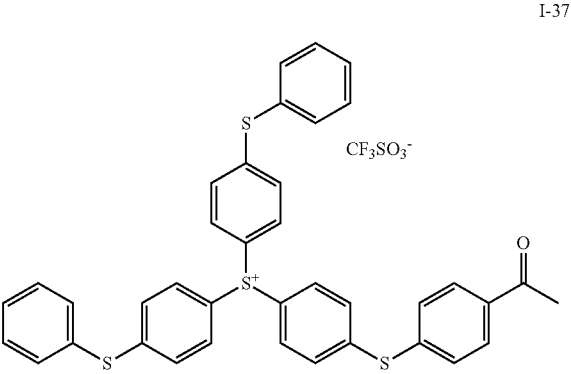
The composition to be used in the alignment layer is preferably prepared as a coating liquid. The solvent to be used for preparing the coating liquid preferably contain water, more preferably contain water in an amount of equal to or more than 20% by mass, or even more preferably contain water in an amount of from 50 to 80% by mass. It is possible to prevent or control the dissolution of the substrate into the solvent by using any coating liquid containing water.

An amount of each of the ingredients contained in the composition for preparing the alignment layer may be decided so as to form the alignment layer stably. For example, an amount of the polymer material which is the main ingredient of the alignment layer is from 2.0 to 10.0% by mass, or more preferably from 2.0 to 5.0% by mass, with respect to the total mass of the composition (may contain the solvent). An amount of the photo-acid-generating agent to be added may be decided depending on the range capable of exchanging the counter anion with the above-described onium salt, and for example, is from 0.1 to 10.0% by mass, or more preferably from 0.5 to 5.0% by mass, with respect to the polymer material of the alignment layer. An amount of the solvent of the composition is for example from 80 to 98% by mass, or more preferably from 90 to 97% by mass, with respect to the total mass of the composition.

Another preferred example of the patterned alignment film used during the formation of the patterned optically anisotropic layer is a patterned alignment film having a horizontal alignment film and an orthogonal alignment film formed in a pattern as in a predetermined patterned optically anisotropic layer. Such a patterned alignment film is, for example, formed through a process at least involving a first step of forming a first alignment-controlling region composed of a first composition on a transparent support and a second step of printing a second alignment-controlling region composed of a second composition containing components different from those of the first composition in a pattern. In this process, one of the first and second alignment-controlling regions functions as a horizontal alignment film, and the other functions as an orthogonal alignment film. The first alignment-controlling region may be entirely or partially formed on a surface of the transparent support. In the entire formation of the first alignment-controlling region, the second alignment-controlling region is partially printed on the first alignment-controlling region in a pattern. In the partial formation of the first alignment-controlling region, the second alignment-controlling region is printed in a pattern on a surface of the transparent support on which the first alignment-controlling region is not formed. The second alignment-controlling region is printed, for example, by a flexographic printing process. The patterned alignment film produced through this process is subjected to alignment treatment in one direction (e.g., rubbing treatment), so that liquid crystal molecules can be aligned such that their longitudinal axes are horizontal to a direction of the alignment treatment in one alignment region and orthogonal to the direction of the alignment treatment in the other alignment region. The details of this process and the alignment film produced thorough this process are disclosed in Japanese Patent Application No. 2010-173077 (PCT/JP2011/67255).

Optically Anisotropic Patterned Layer:

In the 3) step, a composition, a coating liquid, containing a polymerizable liquid crystal as a main ingredient is applied to a surface subjected to a rubbing treatment of the alignment layer. The coating method is not limited, and any known coating method such as a curtain coating method, dip coating method, spin coating method, printing coating method, spray coating method, slot coating method, roll coating method, slide coating method, blade coating method, gravure coating method or wire bar coating method may be used.

In the 4) step, the liquid crystal is aligned so that the slow axis thereof is perpendicular or parallel to the rubbed direction. This enables the first or second slow axis to be determined, and the first and second retardation layers having the slow axis perpendicular to each other are formed. Furthermore, the alignment state achieved in this step by the liquid crystal is a factor determining the optical properties (Re and Rth) of the optically anisotropic layer. One preferable example of the optically anisotropic layer is a λ/4 plate capable of changing a linearly polarized light to a circularly polarized light. The optically anisotropic layer functioning as a λ/4 plate may be prepared according to any method. One example thereof is a method comprising a step of fixing the alignment state in which the slow axis of a rod-like liquid crystal compound having a polymerizable group is parallel to the layer plane, or a method comprising a step of fixing the alignment state in which the disc-like plane of a discotic liquid crystal is vertical to the layer plane. The latter method is more preferable.

One example of the composition to be used for preparing the optically anisotropic layer contains at least one liquid crystal compound, having a polymerizable group, and at least one alignment-controlling agent. The composition may further contain a polymerization initiator or a sensitizer.

Each of the materials which can be used will be described in details hereinafter.

[Liquid Crystal Compound Having a Polymerizable Group]

Examples of the liquid crystal, which can be used as a main ingredient for the optically anisotropic layer of the invention, include rod-like liquid crystals and discotic liquid crystals. Discotic liquid crystals are preferable, and discotic liquid crystals having a polymerizable group are more preferable as described above.

Examples of the polymerizable rod-like liquid crystal compound include those described in Makromol. Chem., vol. 190, p. 2255 (1989), Advanced Materials, vol. 5, p. 107 (1993), U.S. Pat. No. 4,683,327, U.S. Pat. No. 5,622,648, U.S. Pat. No. 5,770,107, WO95/22586, WO95/24455, WO97/00600, WO98/23580, WO98/52905, JPA No. 1-272551, JPA No. 6-16616, JPA No. 7-110469, JPA No. 11-80081 and JPA No. 2001-328973. Plural types of polymerizable rod-like liquid crystal compounds may be used in combination, and any compound selected from those described in the documents may be used.

The low-molecular weight rod-like liquid crystal compound is preferably selected from formula (X).

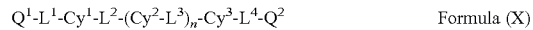

$$Q^1\text{-}L^1\text{-}Cy^1\text{-}L^2\text{-}(Cy^2\text{-}L^3)_n\text{-}Cy^3\text{-}L^4\text{-}Q^2 \qquad \text{Formula (X)}$$

In the formula, $Q^1$ and $Q^2$ each independently represent a polymerizable group; $L^1$ and $L^4$ each independently represent a divalent linking group; $L^2$ and $L^3$ each independently represent a single bond or a divalent linking group; $Cy^1$, $Cy^2$ and $Cy^3$ each independently represent a divalent cyclic group; and n is 0, 1 or 2.

In the formula, $Q^1$ and $Q^2$ each independently represent a polymerizable group. The polymerization of the polymerizable group is an addition polymerization (including ring-opening polymerization) or a condensation polymerization. In other words, the polymerizable group is preferably a functional group capable of addition polymerization or condensation polymerization.

The discotic liquid crystal which can be used in the present invention as a main ingredient of the optically anisotropic layer is preferably selected from the compounds having a polymerizable group as describe above.

[Discotic Liquid Crystal Compound]

Examples of discotic liquid crystals are described in various documents and include benzene derivatives described in a research report by C. Destrade et al. (Mol. Cryst. Vol. 71, page 111 (1981); torxene derivatives described in a research report by C. Destrade et al., Mol. Cryst. Vol. 122, page 141

(1985), Physics lett, A, Vol. 78, page 82 (1990); cyclohexane derivatives described in a research report by B. Kohne et al. Angew. Chem., Vol. 96, page 70 (1984), azacrown based and phenyl acetylene based macrocycles described in research reports by M. Lehn et al. (J. Chem. Commun., page 1794 (1985) and J. Zhang et al., J. Am. Chem. Soc. Vol. 116, page 2655 (1994).

Examples of the discotic compound include compounds having a core and radial side chains of straight alkyl, alkoxy, or substituted benzoyloxy groups. The discotic compound is preferably such a compound that exhibits a rotation symmetry in the state of a molecule or a molecular assembly to be in an alignment.

In the optically anisotropic layer, the discotic compound is not required to exhibit liquid crystalline properties finally. For example, the discotic compound may be a low-molecular discotic compound having a heat- or light-responsive group, which shows no liquid crystalline properties after the compound is aligned into a predetermined state, polymerized or crosslinked by applying heat or light, and fixed to the alignment state.

Preferred examples of the discotic compounds include those described in JP-A No. 8-50206, JP-A No. 2006-76992, [0052], and JP-A No. 2007-2220, [0040]-[0063]. The compounds represented by formula (DI) and (DII) are preferable since they may have high birefringence. Furthermore, among the compounds represented by formula (DI) and (DII), the compounds exhibiting discotic liquid crystallinity are more preferable, and especially, the compounds exhibiting discotic nematic liquid crystallinity are even more preferable. The details (the meaning of the symbols in the formulas and the preferable examples thereof) of the compounds represented by the following formulas are described in the above-mentioned documents.

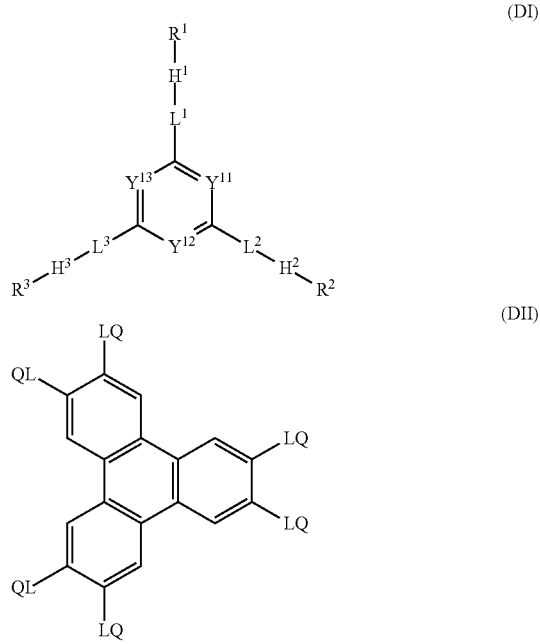

And preferable examples of the discotic liquid crystal compounds include also those described in JP-A No. 2005-301206. [Onium Salt Compound (Agent for Controlling Alignment at Alignment Layer)]

According to the present invention, any onium salt compound is preferably added for achieving the vertical alignment of the liquid crystal compound having the polymerizable group, or especially, the discotic liquid crystal having the polymerizable group. The onium salt may localize at the alignment layer interface, and may function to increase the tilt angles of the liquid crystal molecules in the area neighboring to the alignment layer As the onium salt compound, the compound represented by formula (1) is preferable.

$$Z—(Y-L-)_n Cy^+.X^- \qquad \text{Formula (1)}$$

In the formula, Cy represents a 5-membered or 6-membered cyclic onium group; the definitions of L, Y, Z and X are same as those of $L^{23}$, $L^{24}$, $Y^{22}$, $Y^{23}$, $Z^{21}$ and X in formula (II) described layer, and these preferable examples are same as those of them in formula (II); and n represents an integer of equal to or more than 2.

The 5-membered or 6-membered onium group (Cy) is preferably pyrazolium ring, imidazolium ring, triazolium ring, tetrazolium ring, pyridium ring, pyrimidinium ring or triazinium ring, or more preferably imidazolium ring or pyridinium ring.

The 5-membered or 6-membered onium group (Cy) has preferably the group which is with an affinity for the material in the alignment layer. The onium salt compound may localize at the alignment layer interface in the area (non-irradiated area) where the photo-acid-generating agent is not decomposed since the onium salt compound is with an affinity for the alignment layer. On the other hand, the localization of the onium salt compound at the alignment layer interface may be lowered in the area (irradiated area) where the photo-acid-generating agent is decomposed and the acid generates since the affinity is lowered via the ion-exchange caused by the anion of the onium salt. The hydrogen bonding may become the state forming the bonding or the state losing the bonding in the temperature range (from a room temperature to 1500 degrees Celsius) at which the liquid crystal is actually aligned, and the affinity via the hydrogen bonding is preferably used. However, the invention is not limited to the example.

For example, according to the embodiment employing the polyvinyl alcohol as a material of the alignment layer, the onium salt preferably has the group which is capable of forming the hydrogen bonding to form the hydrogen bonding with a hydroxy group of the polyvinyl alcohol. The theoretical interpretation of the hydrogen bonding is reported, for example, in Journal of American Chemical Society, vol. 99, pp. 1316-1332, 1977, H. Uneyama and K. Morokuma. The concrete modes of the hydrogen bonding are exemplified in FIG. 17 on page 98 described in "Intermolecular and Surface Forces (Bunshikanryoku to Hyoumenn Chohryoku)" written by Jacob Nissim Israelachvili, translated in Japanese by Tamotsu Kondoh and Hiroyuki Ohshima, and published by McGraw-Hill Company in 1991. Examples of the hydrogen bonding include those described in Angewante Chemistry International Edition English, col. 34, 00.2311, 1955, G. R. Desiraju.

The 5-membered or 6-membered cyclic onium group having a hydrogen bonding group may increase the localization at the alignment layer interface and promote the orthogonal alignment with respect to the main chain of the polyvinyl alcohol by the hydrogen bonding with the polyvinyl alcohol along with the affinity effect of the onium group. Preferable examples of the hydrogen bonding group include an amino group, carbamide group, sulfonamide group, acid amide group, ureido group, carbamoyl group, carboxyl group, sulfo group, nitrogen-containing heterocyclic group (such as imidazolyl group, benzimidazolyl group pyrazolyl group, pyridyl group, 1,3,5-triazyl group, pyrimidyl group, pyridazyl group, quinonyl group, benzoimidazolyl group, benzothiazolyl, succinimide group, phthalimide group, maleimide group, uracil group, thiouracil group, barbituric acid group, hydantoin group, maleic hydrazide group, isatin group, and uramil group). More preferable examples of the hydrogen bonding include an amino group and pyridyl group.

For example, the 5-membered or 6-membered onium ring such as an imidazolium ring in which any atom(s) capable of forming the hydrogen bonding is embedded is also preferable In the formula, n is preferably an integer of from 2 to 5, more preferably 3 or 4, or most preferably 3. Plural L and Y may be same or different from each other respectively. The onium salt represented by formula (1) in which n is not smaller than 3 has 3 or more numbers of the 5-membered or 6-membered rings, may interact with the discotic liquid crystal by the intermolecular n-n interaction, and, on the polyvinyl-alcohol alignment layer, can achieve the orthogonal-vertical alignment with respect to the polyvinyl-alcohol main chain.

The onium salt represented by formula (1) is preferably selected from the pyridinium compounds represented by formula (2a) or the imidazolium compounds represented by formula (2b).

The compound represented by formula (2a) or (2b) may mainly be added to the discotic liquid crystal represented by any one of the formulas (DI)-(DI) for controlling the alignment of the liquid crystal compound at the alignment layer interface, and may have a function of increasing the tilt angles of the discotic liquid crystal molecules in the area neighboring to the alignment layer interface.

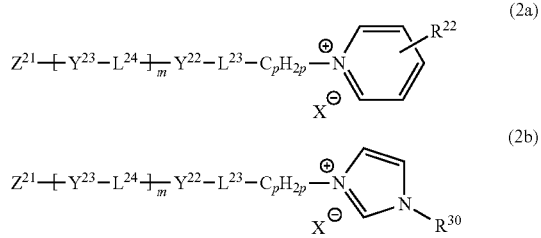

In the formula, $L^{23}$ and $L^{24}$ represent a divalent linking group respectively.

$L^{23}$ is preferably a single bond, —O—, —O—CO—, —CO—O—, —C≡C—, —CH=CH—, —CH=N—, —N=CH—, —N=N—, —O-AL-O—, —O-AL-O—CO—, —O-AL-CO—, —N=N—, —CO—O-AL-O—, —CO—O-AL-O—CO—, —CO—O-AL-CO—O—, —O—CO-AL-O—, —O—CO-AL-O—CO— or —O—CO-AL-CO—O—, and AL is a $C_{1-10}$ alkylene group. $L^{23}$ is more preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—, even more preferably a single bond or —O—, or most preferably —O—.

$L^{24}$ is preferably a single bond, —O—, —O—CO—, —CO—O—, —C≡C—, —CH=CH—, —CH=N—, —N=CH— or —N=N—, or more preferably —O—CO— or —CO—O—. If n is equal to or larger than 2, a plurality of $L^{24}$ preferably represents —O—CO— or —CO—O— alternately.

If $R^{22}$ is a dialkyl-substituted amino group, the two alkyls may connect to each other to form a nitrogen-containing heterocyclic ring. The nitrogen-containing heterocyclic ring is preferably a 5-membered or 6-membered ring. $R^{23}$ preferably represents a hydrogen atom, non-substituted amino group or $C_{2-12}$ dialkyl substituted amino group, or even more preferably, a hydrogen atom, non-substituted amino group or $C_{2-8}$ dialkyl substituted amino group. If $R^{23}$ is a non-substituted or substituted amino group, the 4-position of the pyridinium is preferably substituted.

X represents an anion.

X preferably represents a monovalent anion. Examples of the anion include halide ion (such as fluorine ion, chlorine ion, bromine ion and iodide ion) and sulfonic acid ions (such as methane sulfonate ion, p-toluene sulfonate ion and benzene sulfonate ion).

$Y^{22}$ and $Y^{23}$ represent a divalent linking group having a 5-membered or 6-membered ring as a part structure respectively.

The 5-membered or 6-membered ring may have at least one substituent. Preferably, at least one of $Y^{22}$ and $Y^{23}$ is a divalent linking group having a 5-membered or 6-membered ring with at least one substituent as a part structure. Preferably, $Y^{22}$ and $Y^{23}$ each independently represent a divalent linking group having a 6-membered ring, which may have at least one substituent, as a part structure. The 6-membered ring includes an alicyclic ring, aromatic ring (benzene ring) and heterocyclic ring. Examples of the 6-membered alicyclic ring include a cyclohexane ring, cyclohexane ring and cyclohexadiene ring. Examples of the 6-membered heterocyclic ring include pyrane ring, dioxane ring, dithiane ring, thiin ring, pyridine ring, piperidine ring, oxazine ring, morpholino ring, triazine ring, pyridazine ring, pyrimidine ring, pyrazine ring, piperazine ring and triazine ring. Other 6-membered or 5-membered ring(s) may be condensed with the 6-membered ring Examples of the substituent include halogen atoms, cyano, $C_{1-12}$ alkyls and $C_{1-12}$ alkoxys. The alkyl or alkoxy may have at least one $C_{2-12}$ acyl or $C_{2-12}$ acyloxy. The substituent is preferably selected from $C_{1-12}$ (more preferably $C_{1-6}$, even more preferably $C_{1-3}$) alkyls. The 5-membered or 6-membered ring may have two or more substituents. For example, if $Y^{22}$ and $Y^{23}$ are phenyls, they may have from 1 to 4 $C_{1-12}$ (more preferably $C_{1-6}$, or even more preferably $C_{1-3}$) alkyls.

In the formula, m is 1 or 2, or is preferably 2. If m is 2, plural $Y^{23}$ and $L^{24}$ may be same or different from each other respectively.

In the formula, $Z^{21}$ is a monovalent group selected from the group consisting of a halogen-substituted phenyl, nitro-substituted phenyl, cyano-substituted phenyl, $C_{1-10}$ alkyl-substituted phenyl, $C_{2-10}$ alkoxy-substituted phenyl, $C_{1-12}$ alkyl, $C_{2-20}$ alkynyl, $C_{1-12}$ alkoxy, $C_{2-13}$ alkoxycarbonyl, $C_{7-26}$ aryloxycarbonyl and $C_{7-26}$ arylcarbonyloxy.

If m is 2, $Z^{21}$ is preferably cyano, a $C_{1-10}$ alkyl or a$C_{1-10}$ alkoxy, or more preferably a $C_{4-10}$ alkoxy.

If m is 1, $Z^{21}$ is preferably a $C_{7-12}$ alkyl, $C_{7-12}$ alkoxy, $C_{7-12}$ acyl-substituted alkyl, $C_{7-12}$ acyl-substituted alkoxy, $C_{7-12}$ acyloxy-substituted alkyl or $C_{7-12}$ acyloxy-substituted alkoxy.

The acyl is represented by —CO—R, the acyloxy is represented by —O—CO—R, and R represents an aliphatic group (including alkyl, substituted alkyl, alkenyl, substituted alkenyl, alkynyl and substituted alkynyl), or an aromatic group (including aryl and substituted aryl). R is preferably an aliphatic group, or more preferably an alkyl or alkenyl.

In the formula, p is an integer of from 1 to 10, or preferably 1 or 2. $C_pH_{2p}$ represents an alkylene chain which may have a branched structure. $C_pH_4$, is preferably a linear alkylene chain (—$(CH_2)_p$—).

In formula (2b), $R^{30}$ represents a hydrogen atom or a C1-12 (preferably $C_{1-6}$, or more preferably $C_{1-2}$) alkyl group.

Among the compounds represented by formula (2a) or (2b), the compound represented by formula (2a') or (2') is preferable.

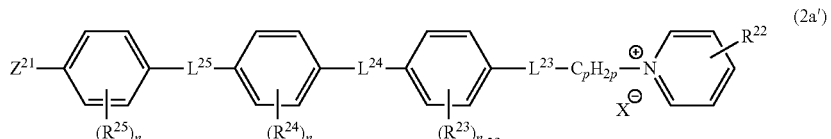

(2a')

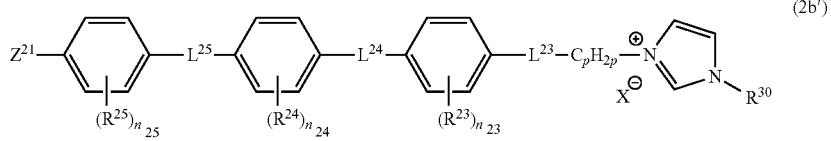

(2b')

Among the symbols in the formula (2a') or (2b'), the same symbols have the same definition as those found in formula (2), and preferable examples thereof are same as those in formula (2). Preferably, $L^{24}$ and $L^{25}$ represent —O—CO— or —CO—O—; or more preferably, $L^{24}$ is —O—CO— and $L^{25}$ is —CO—O—.

$R^{23}$, $R^{24}$ and $R^{25}$ represent a $C_{1-12}$ (more preferably $C_{1-6}$, or even more preferably $C_{1-3}$) alkyl respectively. In the formula, $n_{23}$ is from 0 to 4, $n_{24}$ is from 1 to 4, and $n_{25}$ is from 0 to 4. Preferably, $n_{23}$ and $n_{25}$ are 0, and $n_{24}$ is from 1 to 4 (more preferably from 1 to 3).

Preferably, $R^{30}$ represents a $C_{1-12}$ (more preferably $C_{1-6}$, or even more preferably $C_{1-3}$) alkyl.

Examples of the compound represented by formula (1) include those described in JP-A-2006-113500, columns 0058-0061.

Specific examples of the compound represented by formula (1) include, but are not limited to, those shown below.

the pyridinium derivative may be prepared according to the method wherein a pyridine ring is subjected to an alkylation (Menschutkin reaction).

An amount of the onium salt may be not more than 5% by mass, or preferably about 0.1 to about 2% by mass, with respect to an amount of the liquid crystal compound.

The onium salt represented by formula (2a) or (2b) may localize at the surface of the hydrophilic polyvinyl alcohol alignment layer since the pyridinium or imidazolium group is hydrophilic. Especially, the pyridinium group, or the pyridinium group, having an amino which is an acceptor of a hydrogen atom (in formula (2a) or (2a'), $R^{22}$ is a non-substituted amino or $C_{1-20}$ substituted amino), may form an intermolecular hydrogen bonding with the polyvinyl alcohol, may localize at the surface of the alignment layer densely, and may promote the orthogonal alignment of the liquid crystal with respect to the rubbing direction along with the pyridinium derivative, which is aligned along the direction orthogonal to

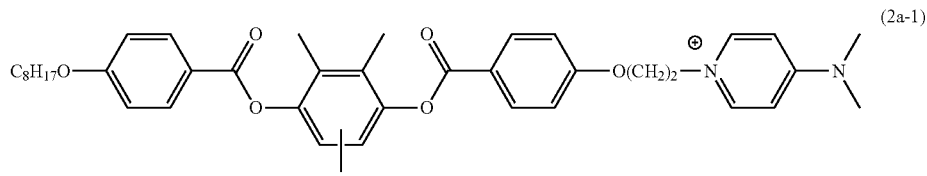

(2a-1)

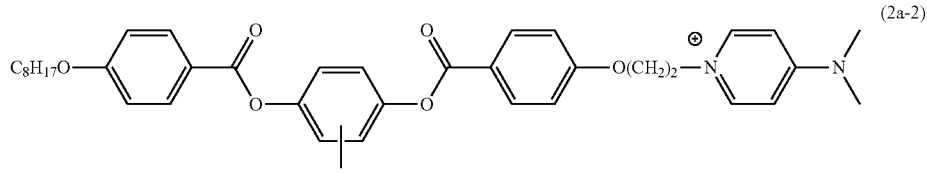

(2a-2)

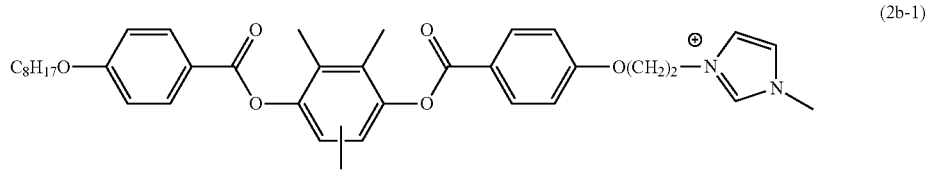

(2b-1)

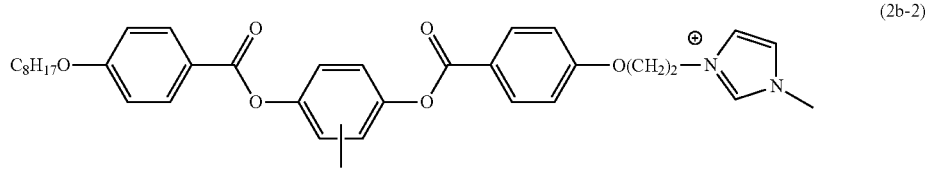

(2b-2)

The compound represented by formula (2a) or (2b) may be prepared according to a usual method. For example, usually, the polyvinyl alcohol main chain, by the effect of the hydrogen bonding. The pyridinium derivative having plural aromatic rings may interact with the liquid crystal, especially discotic liquid crystal, by the strong intermolecular n-n interaction, and may induce the orthogonal alignment of the discotic liquid crystal in the area neighboring to the alignment layer. Especially, as represented by formula (2a'), the compound in which the hydrophilic pyridinium group is connected with the hydrophobic aromatic ring may have an effect of inducing the vertical alignment by the hydrophobic property.

Furthermore, in the embodiment using the onium salt represented by formula (2a) or (2b), the anion-exchange between the onium salt and the acidic compound, generating from the photo-acid generating agent compound via the photo-decomposition, may be carried out, the localization at the alignment layer interface may be lowered by the change in the hydrogen-bonding ability or the hydrophilicity of the onium salt, and as a result, the liquid crystal may be aligned so that the slow axis thereof is parallel to the rubbing direction. This is because the onium salt may be dispersed in the alignment layer uniformly via the salt-exchange, the density thereof at the surface of the alignment layer may be lowered, and the liquid crystal may be aligned via the controlling ability of the rubbed alignment layer itself.

[Fluoroaliphatic Group-Containing Copolymer (Agent for Controlling Alignment at Air-Interface)]

The fluoroaliphatic group-containing copolymer may be added to the liquid crystal for controlling the alignment of the discotic liquid crystal represented by formula (I) at the air-interface, and may have a function of increasing the tilt angles of the liquid crystal molecules in the area neighboring to the air interface. And the copolymer may also have a function of improving the coating properties such as unevenness or repelling.

Examples of the fluoroaliphatic group-containing copolymer which can be used in the present invention include those described in JP-A-2004-333852, JP-A-2004-333861, JP-A-2005-134884, JP-A-2005-179636, and JP-A-2005-181977. The polymers having a fluoroaliphatic group and at least a hydrophilic group selected from the group consisting of carboxyl {—COOH), sulfo (—SO$_3$H), phosphonoxy {—OP(=O)(OH)$_2$)} and any salts thereof, described in JP-A-2005-179636 and JP-A-2005-181977 are preferable.

An amount of the fluoroaliphatic group-containing copolymer is less than 2% by mass, or preferably from 0.1 to 1% by mass with respect to an amount of the liquid crystal compound.

The fluoroaliphatic group-containing copolymer may localize at the air-interface by the hydrophobic effect of the fluoroaliphatic group, and may provide the low-surface energy area at the air-interface, and the tilt angle of the liquid crystal compound, especially discotic liquid crystal compound, in the area may be increased. Furthermore, by using the copolymer having the hydrophilic group selected from the group consisting of carboxyl (—COOH), sulfo (—SO$_3$H), phosphonoxy {—OP(=O)(OH)$_2$)} and any salts thereof, the vertical alignment of the liquid crystal may be achieved by the charge repulsion between the anion of the copolymer and the n electrons of the liquid crystal.

[Solvent]

The composition to be used for preparing the optically anisotropic layer is preferably prepared as a coating liquid. Organic solvents are preferably used as the solvent used for preparing the coating liquid. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halide (e.g., chloroform, dichloromethane), esters (e.g., methyl acetate, butyl acetate), ketones (e.g., acetone, methyl ethyl ketone), and ethers (e.g., tetrahydrofuran, 1,2-dimethoxyethane). Alkyl halides and ketones are preferable. Two or more species of organic solvent can be combined.

[Polymerization Initiator]

The composition (for example coating liquid) containing the liquid crystal having the polymerizable group(s) is aligned in any alignment state, and then, the alignment state is preferably fixed via the polymerization thereof (the 5) step in the above-described process). The fixation is preferably carried out by polymerization reaction between the polymerizable groups introduced into the liquid crystalline compound. Examples of the polymerization reaction include thermal polymerization reaction using a thermal polymerization initiator, and photo-polymerization reaction using a photo-polymerization initiator, wherein photo-polymerization reaction is more preferable. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046, 127 and 2,951,758), combinations of triarylimidazole dimer and p-aminophenyl ketone (those described in U.S. Pat. No. 3,549,367), acrydine and phenazine compounds (those described in Japanese Laid-Open Patent Publication No. S60-105667 and U.S. Pat. No. 4,239,850), and oxadiazole compounds (those described in U.S. Pat. No. 4,212,970). Examples of the cationic photo-polymerization initiator include organic sulfonium salts, iodonium salts and phosphonium salts, organic solfonium salts are preferable, and triphenyl sulfonium salts are especially preferable. Preferable examples of the counter ion thereof include hexafluoro antimonate and hexafluoro phosphate.

An amount of the photo-polymerization initiator to be used is preferably from 0.01 to 20% by mass, or more preferable from 0.5 to 5% by mass, with respect to the solid content of the coating liquid.

[Sensitizer]

For enhancing the sensitivity, any sensitizer may be used along with the polymerization initiator. Examples of the sensitizer include n-butyl amine, triethyl amine, tri-n-butyl phosphine and thioxanthone. The photo-polymerization initiator may be used in combination with other photo-polymerization initiator(s). An amount of the photo-polymerization initiator is preferably from 0.01 to 20% by mass, or more preferably from 0.5 to 5% by mass, with respect to the solid content of the coating liquid. For carrying out the polymerization of the liquid crystal compound, an irradiation with UV light is preferably performed.

[Other Additives]

The composition may contain any polymerizable non-liquid-crystal monomer(s) along with the polymerizable liquid crystal compound. Preferable examples of the polymerizable monomer include any compounds having vinyl, vinyloxy, acryloyl or methacryloyl. Using any multi-functional monomer, having two or more polymerizable groups, such as ethylene oxide modified trimethylolpropane acrylate may contribute to improving the durability, which is preferable. An amount of the non-liquid-crystal polymerizable monomer to be used is preferably less than 40% by mass, or more preferably from 0 to 20% by mass, with respect to the amount of the liquid crystal compound.

The thickness of the optically anisotropic layer is not limited, and preferably from 0.1 to 10 micro meters, or more preferably from 0.5 to 5 micro meters.

Dyed Portion

The patterned optically anisotropic layer, which has the adjoining first and second retardation regions and the boundary having the width L1 and interposed therebetween, preferably has the dyed portion provided at a position corresponding to the boundary to reduce light leakage. The dyed portion is preferably provided on at least one of the upper and lower sides of the patterned optically anisotropic layer. The dyed portion preferably has a black color or a hue similar to black in terms of a reduction in light leakage and preferably contains one or more pigments to exhibit such a color or hue. Examples of the usable pigments include pigments or other materials traditionally used for forming black matrixes for color filters. The dyed portion can be formed on the patterned optically anisotropic layer by, for instance, a printing process, and an example of the printing process is a flexographic printing process.

Shutter Polarizing Plate

Two polarizing plates of the present invention can be combined to form a shutter polarizing plate. The two polarizing plates to be combined preferably include patterned optically anisotropic layers, respectively. The two polarizing plates are preferably combined such that the patterned optically anisotropic layers face each other (optionally separated from each other). The polarizers included in the two polarizing plates to be combined preferably have absorption axes orthogonal to each other. For example, a transmission mode and a shielding mode are changed by sliding any one of the polarizing plates by the width of the retardation region of the patterned optically anisotropic layer, and a sliding mechanism may be provided.

Figure 7:
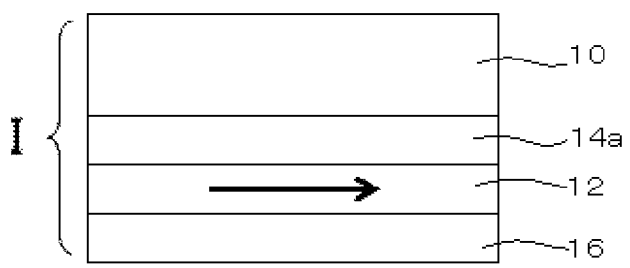
FIG. 7 is a schematic cross-sectional view illustrating a shutter polarizing plate according to an embodiment of the present invention.
Figure 7:
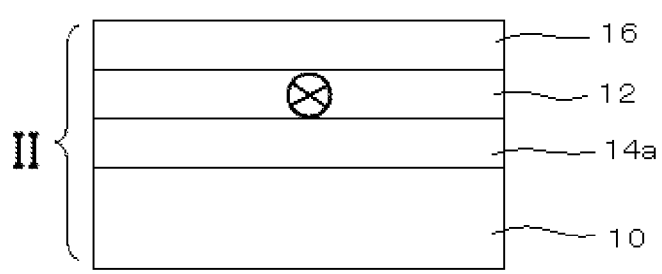

FIG. 7 is a schematic cross-sectional view illustrating an embodiment of a shutter polarizing plate including a combination of two polarizing plates of the embodiment in FIG. 3.

In the embodiment illustrated in FIG. 7, two polarizing plates I and II of the embodiment in FIG. 3 are combined such that the patterned optically anisotropic layers 16 face each other at a distance from each other. The retardation regions of the patterned optically anisotropic layers 16 included in the polarizing plates have in-plane slow axes at ±45° relative to the absorption axes of the polarizers 12 as illustrated in FIG. 6 and the polarizers 12 of the polarizing plates have absorption axes orthogonal to each other. For example, one polarizer 12 has an absorption axis orthogonal to the striped pattern of the patterned optically anisotropic layer 16, and the other polarizer 12 has an absorption axis parallel to the striped pattern of the patterned optically anisotropic layer 16.

Figure 8:
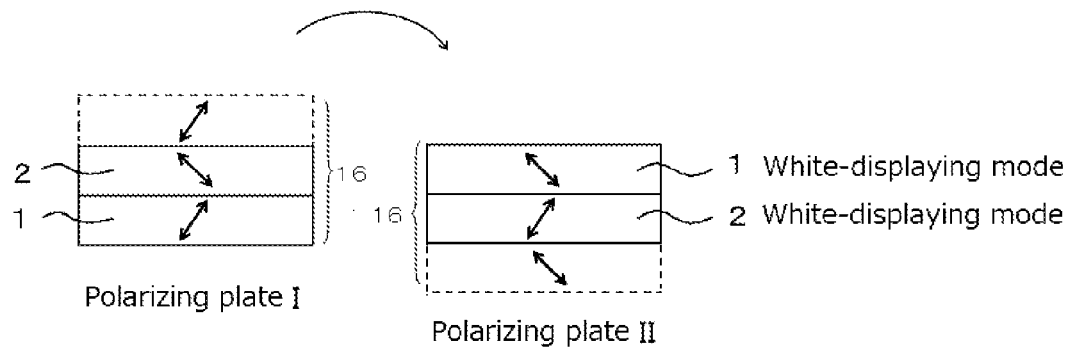
FIG. 8A is a schematic view illustrating a function of a shutter polarizing plate according to an embodiment of the present invention.
FIG. 8B is a schematic view illustrating a function of a shutter polarizing plate according to another embodiment of the present invention.
Figure 8:
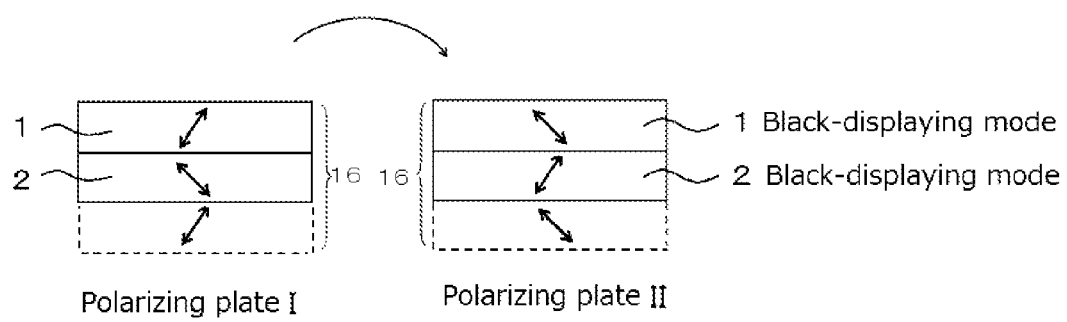

In a state in which the pattern of the optically anisotropic layer 16 of the polarizing plate I corresponds to that in the polarizing plate II as illustrated in FIG. 8A, linearly polarized light which has passed through the polarizer 12 of the polarizing plate I passes through two first retardation regions or two second retardation regions having in-plane slow axes in the same direction and exhibiting λ/4 retardation and then converted into linearly polarized light turned at 90°. Since the polarizers 12 included in the polarizing plates I and II, respectively, have absorption axes orthogonal to each other, the linearly polarized light can pass through the polarizer 12 of the polarizing plate II (transmission mode).

In contrast, in a state of a misaligned pattern in which the polarizing plate I is slid by the width of the retardation region as illustrated in FIG. 8B, linearly polarized light which has passed through the polarizer 12 of the polarizing plate I passes through the first retardation region and the second retardation region having in-plane slow axes orthogonal to each other and exhibiting λ/4 retardation and is therefore free from the effect of retardation, so that the polarization state of the light can be maintained. Since the polarizers 12 included in the polarizing plates I and II, respectively, have absorption axes orthogonal to each other, the linearly polarized light is absorbed by the polarizer 12 of the polarizing plate II (shielding mode).

The polarizing plate of the present invention can be used in various applications which need photochromic properties or light-shielding properties. In particular, examples of such applications include image-related fields, such as lenses for photographing, finders, filters, prisms, and Fresnel lenses used in cameras, video tape recorders (VTRs), and projectors; lens-related fields, such as pickup lenses used for optical disks [e.g., used in compact disk (CD) players, digital versatile disk (DVD) players, and mini disk (MD) players]; photorecording-related fields for optical disks used in CD players, DVD players, and MD players; information equipment-related fields, such as light guide plates for liquid crystal apparatuses, films for liquid crystal displays (e.g., polarizer-protecting films and retardation films), and surface protective film; photocommunication-related fields, such as optical fibers, optical switches, and optical connectors; vehicle-related fields, such as lenses of headlights and taillights of vehicles, inner lenses, instrument covers, and sunroofs; a medical-related fields, such as eyeglasses, contact lenses, endoscopic lenses, medical products which need sterilization; fields related to construction and building materials, such as translucent plates provided to roads, lenses for double glass, lighting windows, carports, lighting lenses and covers, and sidings for building materials; and containers (dishes) for microwave cooking. Especially, the polarizing plate of the present invention can be used in a variety of windows of buildings, e.g., housing such as detached houses and apartment buildings and commercial buildings such as office buildings. In addition to utilization in the windows of buildings, the polarizing plate of the present invention can be used in windows of vehicles such as automobiles.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (21) and (22):

$$Re(\theta) = \left[ nx - \frac{(ny \times nz)}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (21)$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth=\{(nx+ny)/2-nz\} \times d \quad (22):$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth (λ) of the film may be calculated as follows:

Re (λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth (λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

The Re, Rth, and refractive index are herein measured at a wavelength of 550 nm unless otherwise specified.

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

1. Preparation of Optically Transparent Substrate

A glass plate was used as an optically transparent substrate.

2. Preparation of Polarizer

Polyvinyl alcohol films (mean degree of polymerization: 2400, degree of saponification: 99.9 mol %, and thickness: 65 μm) were swelled in water at 30° C. for 60 seconds. Each of the swelled films was then dyed in an aqueous iodine/potassium iodide solution (weight ratio=0.5/8) at a concentration shown in the following table while being stretched. The dyed film was further stretched in an aqueous borate ester solution at 65° C. into a final stretching ratio shown in the following table. The stretched film was dried in an oven at 40° C. for 3 minutes to produce a polarizer shown in the following table.

TABLE 1

| | Process for polarizer | | |
|---|---|---|---|
| No | Initial thickness μm | Iodine/Potassium iodide solution at a concentration | Stretching ratio |
| 1 | 65 | 0.25 | 6 |
| 2 | 65 | 0.25 | 6 |
| 3 | 65 | 0.25 | 6 |
| 4 | 70 | 0.3 | 6 |
| 5 | 60 | 0.23 | 6 |
| 7 | 50 | 0.21 | 5.8 |
| 8 | 55 | 0.2 | 4.5 |
| 11 | 65 | 0.25 | 6 |
| 12 | 65 | 0.25 | 6 |
| 13 | 65 | 0.3 | 6 |
| 14 | 50 | 0.2 | 4.5 |

3. Preparation of Protective Film

The following films were prepared as the protective films of the polarizers.

(1) Cellulose Triacetate (CTA) Film

A cellulose acylate solution (dope) having the following composition was prepared.

| Composition of Dope | |
|---|---|
| Cellulose triacetate | 100.0 parts by mass |
| Triphenyl phosphate | 7.8 parts by mass |
| Biphenyl diphenyl phosphate | 3.9 parts by mass |
| Methylene chloride | 272.0 parts by mass |

-continued

| Composition of Dope | |
|---|---|
| Methanol | 93.0 parts by mass |
| 1-buthanol | 7.0 parts by mass |
| Ultraviolet absorber (mixture of UV1, UV2, and UV3) | 1.0 part by mass |

(mass ratio of UV1/UV2/UV3 = 0.2/0.4/0.4)

(UV-1)

(UV-2)

(UV-3)

A CTA1 film was produced from the dope through a solvent-casting process. The conditions of the film formation were the same as those disclosed in Example 1 in Japanese Patent No. 3974422. Some specific conditions were as follows:
Rate of film formation: 60 m/min;
Layer structure: monolayer;
Temperature of support: −5° C.; and
Temperature of casting die: 35° C.

The produced CTA1 film had the following optical characteristics and a thickness:
Optical characteristics: Re=0 nm and Rth=40 nm; and
Thickness: 60 μm.

Another cellulose triacetate film was similarly produced as a CTA2 film except that no ultraviolet absorber was added.

(2) Cyclic Olefin Polymer (COP) Film

A ZeonorFilm ZF 14 (manufactured by ZEON CORPORATION) was used as a film primarily composed of a cyclic olefin polymer. The thickness, Re, and Rth of this film are shown in the following table.

(3) Polycarbonate (PC) Film

A Panlite PC-2151 (manufactured by TEIJIN LIMITED, thickness: 125 μm) was used as a film primarily composed of polycarbonate. The thickness, Re, and Rth of this film are shown in the following table.

4. Preparation of Patterned Optically Anisotropic Film (1) Preparation of Support Each of the CTA1, CTA2, COP, and PC films used as protective films was used as a support.

(2) Formation of Patterned Alignment Film (2)-1 Formation of Horizontal Alignment Film (First Alignment Film)

A polyvinyl alcohol ("POVAL PVA103" manufactured by KURARAY CO., LTD., 4.0 g) was dissolved in a mixed solvent of water (72 g) and methanol (24 g), and the solution (viscosity: 4.35 cp and surface tension: 44.8 dyne) having a solid content of 4% was applied onto a surface of the support with a #12 bar. The product was then dried at 120° C. for 2 minutes. The produced alignment film had a thickness of 0.9 μm. The alignment film functioned as a horizontal alignment film.

(2)-2 Formation of Orthogonal Alignment Film (Second Alignment Film)

The following composition for an orthogonal alignment film (2.646 g) was dissolved in a mixed solvent of triethylamine (0.658 g) and tetrafluoroproppanol (12 g) to prepare an orthogonal alignment film solution 1 for pattern printing.

(a=40, b=60, Mn=9298, Mw=24249, and Mw/Mn=2.608)

Figure 9:
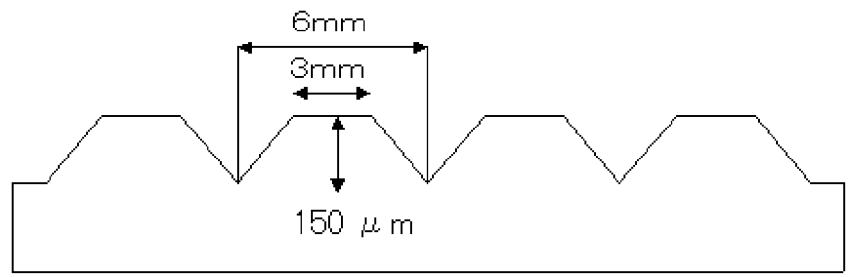
FIG. 9 is a schematic cross-sectional view illustrating an elastic flexographic plate used in Examples.

A flexographic plate made from synthetic rubber and having a surface profile with dimensions illustrated in FIG. 9 was prepared.

Figure 10:
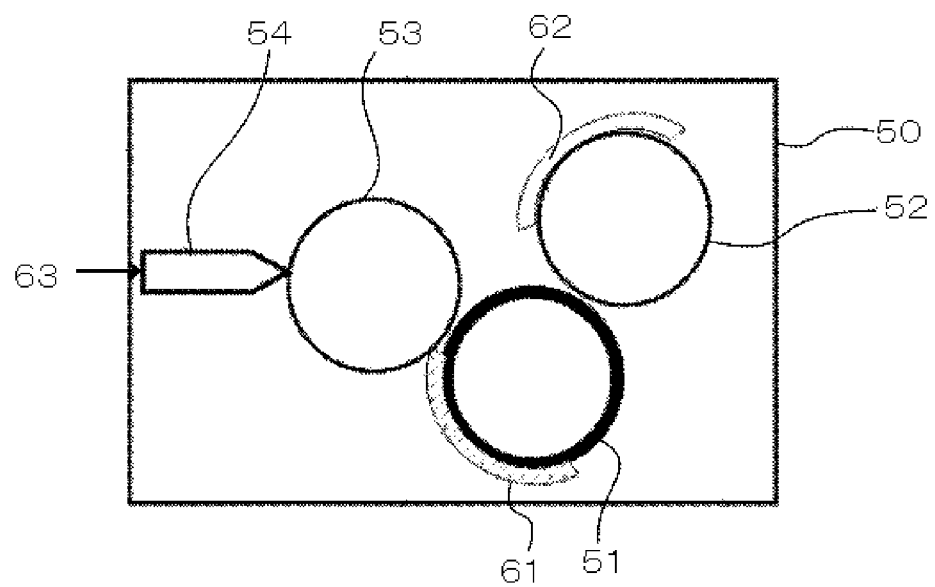
FIG. 10 is a schematic view illustrating a flexographic press used in Examples.

A Flexiproof 100 (manufactured by RK PrintCoat Instruments Ltd.) was used as a flexographic press 50 illustrated in FIG. 10. An anilox roller 53 had cells at a density of 400 lines/cm (capacity: 3 cm³/m²). An elastic flexographic plate 61 having a structure illustrated in FIG. 9 was bonded to an impression cylinder 51 of the Flexiproof 100 with a pressure sensitive tape (not illustrated). One of the support films described above (indicated by the numeral 62 in FIG. 10) was attached to a printing pressure roller 52, and the orthogonal alignment film solution for pattern printing (indicated by numeral 63 in FIG. 10) was put into a doctor blade 54 to print the pattern of an orthogonal alignment film on the horizontal alignment film at a printing rate of 30 m/min (pressure of anilox roller: 40 and pressure of printing pressure roller: 42, no unit of quantity required).

(3) Formation of Dyed Portion (Black Stripe)

A Black stripe was flexographically printed with a black dye composition (HYDRIC FCG manufactured by Dainichiseika Color & Chemicals Mfg. Co., Ltd.) as in the formation of the orthogonal alignment film. The formed black stripe had a width of 300 μm and printed on the boundary between the orthogonal alignment film and the horizontal alignment film in a direction parallel to the orthogonal alignment film.

(4) Rubbing Treatment of Patterned Alignment Film Having Black Stripe

Rubbing treatment was carried out once forward and backward in a direction at 45° with respect to the stripe at a rate of 1000 rpm to produce a support provided with the black stripe and a rubbed alignment film.

(5) Formation of Patterned Optically Anisotropic Layer

A discotic liquid crystal compound 1 having the following composition (0.35 mL) was applied onto the rubbed alignment film having the black stripe by spin coating (2500 rpm, 10 seconds). The product was irradiated with UV light (10 seconds) for curing while being heated at 90° C., and then molecular alignment was observed with a microscope.

Discotic Liquid Crystal Compound 1

Solution of below liquid crystal polymer 3/below polymer initiator 2/below sensitizer 1/below pyridinium compound 1/below air interface alignment agent 2/below air interface alignment agent 3 (=100:3:1:2:0.3:0.5) in methyl ethyl ketone (MEK) containing a 20% solid content.

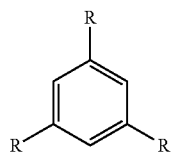

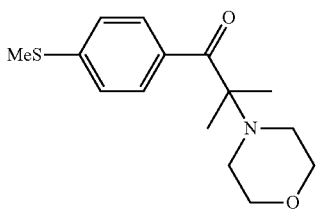

Poly inititator 2

R =

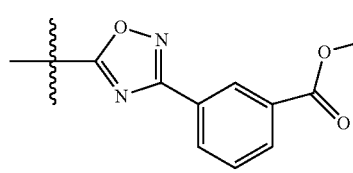

Liquid crystal polymer 3

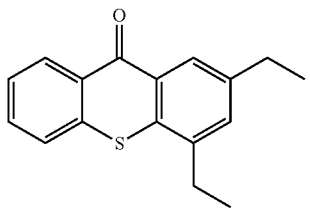

Sensitizer 1

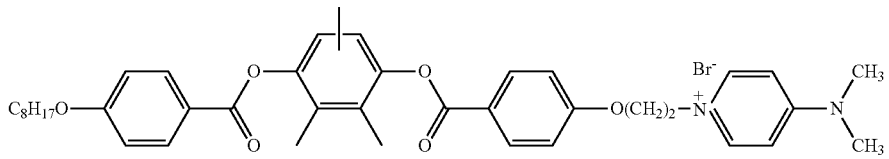

Pyridinium Compound 1

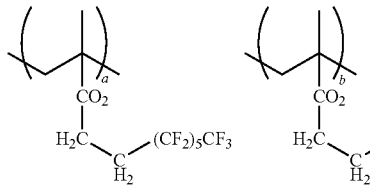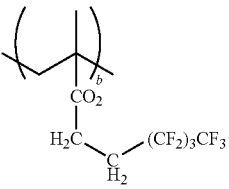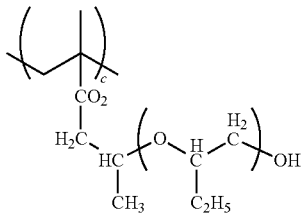

Air interface alignment agent 2

Air interface alignment agent 3
Cellulose acetate butyrate (CAB-551-0.2 manufactured by Eastman Chemical Company)

The first and second retardation regions had a width of 3 mm, the boundary was covered with the black stripe and was not therefore visually observed, and the black stripe had a width of 300 μm. The first and second retardation regions had in-plane slow axes at ±45° with respect to the longitudinal direction of the striped pattern, respectively. The molecules of the discotic liquid crystal were orthogonally aligned in each retardation region, and each retardation region exhibited an Re of 137 nm.

5. Production and Evaluation of Polarizing Plate
(1) Production of Polarizing Plate A film selected from the protective films described above was bonded to each of the two surfaces of the polarizers 1 to 8 with a polyvinyl acetate (PVA) adhesive to produce laminates 1 to 8. Laminates 1 to 8 were bonded to surfaces of the glass plates with Non Support Double-faced Tape SK-2057 (manufactured by Soken Chemical & Engineering Co., Ltd.) to produce polarizing plates 1 to 8 having the same structure as illustrated in FIG. 1, respectively.

(2) Measurement of Transmittance

The spectral transmittance of the produced polarizing plates was measured at a wavelength of 380 to 780 nm with an automatic polarizing film analyzer ("VAP-7070" manufactured by JASCO Corporation). The following table shows the single-plate transmittances $T_1(430)$ % at a wavelength of 430 nm and $T_1(590)$ at a wavelength of 590 nm, and the ratio of $T_1(430)$ to $T_1(590)$.

The crossed transmittance $T_2(430)$ % of the produced polarizing plates at a wavelength of 430 nm was measured. The results of the measurement are shown in the table.

(3) Evaluation of Examples 1 and 8
Visual Evaluation of Tint

The appearance of the polarizing plates adhering to the glass substrates was visually observed and evaluated on the basis of the following criteria.

A: No yellow tint visually observed through the glass as if the glass were not provided;
B: Substantially no yellow tint visually observed through the glass;
C: Slight yellow tint visually observed through the glass; and
D: Distinct yellow tint visually observed through the glass.

Evaluation of Light Leakage

Two polarizing plates of the same type were disposed such that a first polarizer faced a second polarizer and the absorption axis of the first polarizer was orthogonal to the absorption axis of the second polarizer. In this state, leakage of light incident on the lower side of the first polarizer from a point light source was evaluated. The results are shown in the following table.

Evaluation of Light Resistance

The polarizing plates were irradiated with light beams for 500 hours with a xenon lamp and then subjected to measurement of single-plate transmittance, and the results were evaluated on the basis of the following criteria.

A: The rate of change in transmittance was less than 10%;
B: The rate of change in transmittance was 10% or higher and less than 30%; and
C: The rate of change in transmittance was not less than 30%.

3. The patterned optically anisotropic film was attached to the polarizer such that a surface of the polarizer was bonded to the rear surface of the support. In this manner, two polarizing plates having the same structure were prepared.

(2) Measurement of Transmittance

The polarizing plates were subjected to measurement of transmittance in the manner described above. The results of the measurement are shown in the following table.

(3) Production of Shutter Polarizing Plate

The same polarizing plates were laminated such that the patterned optically anisotropic layers faced each other and the polarizing plates were slidable in a direction parallel to the plane of the laminate, thereby producing shutter polarizing plates.

(4) Evaluation

The shutter polarizing plates were also similarly subjected to visual evaluation of tint in a transmission mode, evaluation of light leakage in a shielding mode, and evaluation of light resistance. The results are shown in the following table.

(5) Evaluation of Examples 11 to 14
Visual Evaluation of Tint

Two polarizing plates of each pattern were disposed so as to face each other and such that the slow axes of the patterned optically anisotropic layers were parallel to each other, in other words, the polarizing plates were in a transmission mode. Tint was visually observed and evaluated on the basis of the following criteria.

A: No yellow tint visually observed through the glass as if the glass were not provided;

TABLE 2

| | Polarizer characteristics | | | | Protective film (indicated by the numeral 14a in FIG. 1) | | | |
|---|---|---|---|---|---|---|---|---|
| | $T_1(430)$ | $T_1(590)$ | $T_1(430)/T_1(590)$ | $T_2(430)$ | Film | Thickness μm | Re nm | Rth nm | Ultraviolet absorber |
| 1 | 38.5% | 42.7% | 0.90 | 0.027% | CTA1 | 60 | 0 | 40 | Present |
| 2 | 38.5% | 42.7% | 0.90 | 0.027% | COP | 100 | 0 | 0 | — |
| 3 | 38.5% | 42.7% | 0.90 | 0.027% | PC | 60 | 0 | 2 | — |
| 4 | 37.5% | 41.2% | 0.91 | 0.019% | CTA2 | 60 | 0 | 40 | — |
| 5 | 38.8% | 42.6% | 0.91 | 0.022% | CTA1 | 60 | 0 | 40 | Present |
| 7 | 54.0% | 59.3% | 0.91 | 0.120% | CTA1 | 60 | 0 | 40 | Present |
| 8 | 57.0% | 54.3% | 1.05 | 0.150% | CTA1 | 60 | 0 | 40 | Present |

| | Protective film (indicated by the numeral 14b in FIG. 1) | | | | | Evaluation | | |
|---|---|---|---|---|---|---|---|---|
| | Support | Thickness μm | Re nm | Rth nm | Ultraviolet absorber | Tint | Light Leakage | Light Resistance |
| 1 | CTA1 | 60 | 0 | 40 | Present | C | Small, Goodness | A |
| 2 | COP | 100 | 0 | 0 | — | C | Small, Goodness | B |
| 3 | PC | 60 | Cannot measure | Cannot measure | — | C | Small, Goodness | B |
| 4 | CTA2 | 60 | 0 | 40 | — | C | Dark, yellow | C |
| 5 | CTA1 | 60 | 0 | 40 | Present | B | Small, Goodness | A |
| 7 | CTA1 | 60 | 0 | 40 | Present | C | Small, Goodness | A |
| 8 | CTA1 | 60 | 0 | 40 | Present | C | Blue, Generally | C |

6. Production and Evaluation of Polarizing Plate (1) Production of Polarizing Plate Including Patterned Optically Anisotropic Layer One protective film selected from the above protective films and a patterned optically anisotropic film including a support of the same protective film were bonded to the two surfaces, respectively, of each of polarizers 11 to 14 with a PVA adhesive to produce laminates 11 to 14. Each laminate was bonded to a surface of the glass plate with Non Support Double-faced Tape SK-2057 (manufactured by Soken Chemical & Engineering Co., Ltd.) to produce polarizing plates 11 to 14 having the same structure as illustrated in FIG.

B: Substantially no yellow tint visually observed through the glass;
C: Slight yellow tint visually observed through the glass; and
D: Distinct yellow tint visually observed through the glass.

Evaluation of Light Leakage

Two polarizing plates of each pattern were disposed so as to face each other and such that the slow axes of the patterned optically anisotropic layers were orthogonal to each other, in other words, the polarizing plates were in a shielding mode. In this state, leakage of light incident on the polarizing plates from a point light source was evaluated. The results are shown in the following table.

Evaluation of Light Resistance

Two polarizing plates of each pattern were disposed so as to face each other and such that the slow axes of the patterned optically anisotropic layers were parallel to each other. The polarizing plates were irradiated with light beams for 500 hours with a xenon lamp and then subjected to measurement of single-plate transmittance. The results of the measurement were evaluated on the following criteria.
A: The rate of change in transmittance was less than 10%;
B: The rate of change in transmittance was 10% or higher and less than 30%; and
C: The rate of change in transmittance was not less than 30%.

TABLE 3

| | Polarizer characteristics | | | | Protective film | | | | |
|---|---|---|---|---|---|---|---|---|---|
| | $T_1(430)$ | $T_1(590)$ | $T_1(430)/T_1(590)$ | $T_2(430)$ | Film | Thickness μm | Re nm | Rth nm | Ultraviolet absorber |
| 11 | 38.5% | 42.7% | 0.90 | 0.027% | CTA1 | 60 | 0 | 40 | Present |
| 12 | 38.5% | 42.7% | 0.90 | 0.027% | CTA1 | 60 | 0 | 40 | Present |
| 13 | 38.8% | 42.6% | 0.91 | 0.022% | CTA1 | 60 | 0 | 40 | Present |
| 14 | 57.0% | 54.3% | 1.05 | 0.150% | CTA2 | 60 | 0 | 40 | — |

| | Patterned optically anisotropic layer | | | | | | | | Evaluation | |
|---|---|---|---|---|---|---|---|---|---|---|
| | Support | Thickness μm | Re nm | Rth nm | Ultraviolet absorber | Slow axis*1 | L*2 mm | L1*3 mm | L/L1 | Tint | Light Leakage | Light Resistance |
| 11 | CTA1 | 60 | 125 | −25 | Present | ±45° | 10 | 0.01 | 1000 | B | Small, Goodness | A |
| 12 | CTA1 | 60 | 125 | −25 | Present | ±45° | 10 | 0.01 | 1000 | B | Small, Goodness | A |
| 13 | CTA1 | 60 | 125 | −25 | Present | ±45° | 10 | 0.01 | 1000 | A | Small, Goodness | A |
| 14 | CTA2 | 60 | 125 | −25 | — | ±45° | 10 | 0.01 | 1000 | B | Blue, Generally | C |

*1 Direction of slow axis relative to longitudinal directions of striped patterns of first and second retardation regions;
*2 Width of striped patterns of first and second retardation regions; and
*3 Width of boundary between adjacent first and second retardation regions.

The present disclosure relates to the subject matter contained in Japanese Patent Application No. 235685/2011, filed on Oct. 27, 2011, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A photochromic polarizing plate comprising:
   a laminate including at least one film, a polarizer, and an optically transparent substrate, wherein
   the photochromic polarizing plate has a single-plate transmittance $T_1(\lambda)$% and a crossed transmittance $T_2(\lambda)$% at a wavelength of λ nm satisfying Formulae (1) to (4):

$55\% \geq T_1(430) \geq 38\%$;  Formula (1)

$60\% \geq T_1(590) \geq 42.5\%$;  Formula (2)

$1.0 \geq T_1(430)/T_1(590) \geq 0.9$; and  Formula (3)

$T_2(430) > 0.02\%$.  Formula (4)

2. The photochromic polarizing plate according to claim 1, wherein the single-plate transmittance $T_1(\lambda)$% satisfies Formulae (1') and (2'):

$55\% \geq T_1(430) \geq 38.5\%$; and  Formula (1')

$60\% \geq T_1(590) \geq 43\%$.  Formula (2')

3. The photochromic polarizing plate according to claim 1, wherein the single-plate transmittance $T_1(\lambda)$% satisfies Formulae (1") and (2"):

$55\% \geq T_1(430) \geq 39\%$; and  Formula (1")

$60\% \geq T_1(590) \geq 45\%$.  Formula (2")

4. The photochromic polarizing plate according to claim 1, wherein the layer included in the laminate contains at least one ultraviolet absorber.

5. The photochromic polarizing plate according to claim 1, wherein the laminate includes a patterned optically anisotropic layer having a first retardation region and a second retardation region which have a difference in at least one of the direction of an in-plane slow axis and in-plane retardation characteristics to each other, and
   the first and second retardation regions are arranged at a pattern having a width L of 1 to 50 mm in an arbitrary direction in a plane.

6. The photochromic polarizing plate according to claim 5, wherein the patterned optically anisotropic layer has a boundary having a width L1 between the adjoining first and second retardation regions, and
   the width L and the width L1 satisfy Formula (a):

$100 \leq L/L1 \leq 5{,}000$  Formula (a).

7. The photochromic polarizing plate according to claim 5, further comprising: a dyed portion provided on at least one of the upper and lower sides of the patterned optically anisotropic layer at a position corresponding to the boundary.

8. The photochromic polarizing plate according to claim 5, wherein the first and second retardation regions are stripes having a width L.

9. The photochromic polarizing plate according to claim 5, wherein the in-plane slow axis of the first retardation region and the transmission axis of the polarizer and the in-plane slow axis of the second retardation region and the transmission axis of the polarizer each have an angle of +45° and −45°.

10. The photochromic polarizing plate according to claim 5, wherein the sum of the in-plane retardation Re(550) of the other components of the laminate other than the polarizer is in the range of 110 to 160 nm at a wavelength of 550 nm.

11. The photochromic polarizing plate according to claim 5, further comprising an alignment film adjoining the patterned optically anisotropic layer and subjected to alignment treatment in a single direction.

12. The photochromic polarizing plate according to claim 11, wherein the alignment film is a rubbed alignment film rubbed in a single direction.

13. The photochromic polarizing plate according to claim 5, wherein the patterned optically anisotropic layer comprising a composition primarily containing a discotic liquid crystal having a polymerizable group.

14. The photochromic polarizing plate according to claim 13, wherein the molecules of the discotic liquid crystal are fixed in a vertical alignment state.

15. The photochromic polarizing plate according to claim 1, wherein the single-plate transmittance $T_1(\lambda)\%$ satisfies Formulae (1″) and (2″), $$55\% \geq T_1(430) \geq 39\%; \text{ and} \qquad \text{Formula (1″)}$$

$$60\% \geq T_1(590) \geq 45\%, \qquad \text{Formula (2″)}$$

the laminate includes a patterned optically anisotropic layer having a first retardation region and a second retardation region which have a difference in at least one of the direction of an in-plane slow axis and in-plane retardation characteristics to each other, and the first and second retardation regions are arranged at a pattern having a width L of 1 to 50 mm in an arbitrary direction in a plane.

16. The photochromic polarizing plate according to claim 1, wherein the layer included in the laminate contains at least one ultraviolet absorber, the laminate includes a patterned optically anisotropic layer having a first retardation region and a second retardation region which have a difference in at least one of the direction of an in-plane slow axis and in-plane retardation characteristics to each other, and the first and second retardation regions are arranged at a pattern having a width L of 1 to 50 mm in an arbitrary direction in a plane.

17. The photochromic polarizing plate according to claim 1, wherein the single-plate transmittance $T_1(\lambda)\%$ satisfies Formulae (1″) and (2″), $$55\% \geq T_1(430) \geq 39\%; \text{ and} \qquad \text{Formula (1″)}$$

$$60\% \geq T_1(590) \geq 45\%, \qquad \text{Formula (2″)}$$

the layer included in the laminate contains at least one ultraviolet absorber, the laminate includes a patterned optically anisotropic layer having a first retardation region and a second retardation region which have a difference in at least one of the direction of an in-plane slow axis and in-plane retardation characteristics to each other, and the first and second retardation regions are arranged at a pattern having a width L of 1 to 50 mm in an arbitrary direction in a plane.

18. The photochromic polarizing plate according to claim 1, wherein the laminate includes a patterned optically anisotropic layer having a first retardation region and a second retardation region which have a difference in at least one of the direction of an in-plane slow axis and in-plane retardation characteristics to each other, and the first and second retardation regions are arranged at a pattern having a width L of 1 to 50 mm in an arbitrary direction in a plane, the patterned optically anisotropic layer has a boundary having a width L1 between the adjoining first and second retardation regions, and the width L and the width L1 satisfy Formula (a), $$100 \leq L/L1 \leq 5{,}000, \text{ and} \qquad \text{Formula (a)}$$

which further comprises: a dyed portion provided on at least one of the upper and lower sides of the patterned optically anisotropic layer at a position corresponding to the boundary.

19. The photochromic polarizing plate according to claim 1, wherein the laminate includes a patterned optically anisotropic layer having a first retardation region and a second retardation region which have a difference in at least one of the direction of an in-plane slow axis and in-plane retardation characteristics to each other, and the first and second retardation regions are arranged at a pattern having a width L of 1 to 50 mm in an arbitrary direction in a plane, the first and second retardation regions are stripes having a width L, the in-plane slow axis of the first retardation region and the transmission axis of the polarizer and the in-plane slow axis of the second retardation region and the transmission axis of the polarizer each have an angle of +45° and −45°, and the sum of the in-plane retardation Re(550) of the other components of the laminate other than the polarizer is in the range of 110 to 160 nm at a wavelength of 550 nm.

20. A shutter polarizing plate comprising:

two photochromic polarizing plates according to claim 5.

\* \* \* \* \*